United States Patent
Kato et al.

(10) Patent No.: US 11,080,836 B2
(45) Date of Patent: Aug. 3, 2021

(54) APPEARANCE INSPECTION SYSTEM, IMAGE PROCESSING DEVICE, IMAGING DEVICE, AND INSPECTION METHOD

(71) Applicant: OMRON Corporation, Kyoto (JP)

(72) Inventors: Yutaka Kato, Kyoto (JP); Yasuhito Uetsuji, Kyoto (JP)

(73) Assignee: OMRON Corporation, Kyoto (JP)

( * ) Notice: Subject to any disclaimer, the term of this patent is extended or adjusted under 35 U.S.C. 154(b) by 85 days.

(21) Appl. No.: 16/251,093

(22) Filed: Jan. 18, 2019

(65) Prior Publication Data

US 2019/0279351 A1    Sep. 12, 2019

(30) Foreign Application Priority Data

Mar. 12, 2018  (JP) .............................. JP2018-044035

(51) Int. Cl.
  *G06T 7/00* (2017.01)
  *B25J 9/16* (2006.01)
  *H04N 5/232* (2006.01)

(52) U.S. Cl.
  CPC .......... *G06T 7/0002* (2013.01); *B25J 9/1602* (2013.01); *B25J 9/1664* (2013.01); *B25J 9/1679* (2013.01);
  (Continued)

(58) Field of Classification Search
  CPC ..... G06T 7/0002; B25J 9/1679; B25J 9/1664; B25J 9/1602; H04N 5/23216;
  (Continued)

(56) References Cited

U.S. PATENT DOCUMENTS

2007/0211240 A1    9/2007  Matsumoto et al.
2013/0128028 A1*   5/2013  Nagoshi .................. G02B 7/08
                                              348/125
(Continued)

FOREIGN PATENT DOCUMENTS

CN    101001521    7/2007
CN    101034070    9/2007
(Continued)

OTHER PUBLICATIONS

"Search Report of Europe Counterpart Application", dated Jul. 29, 2019, pp. 1-7.
(Continued)

*Primary Examiner* — Amandeep Saini
(74) *Attorney, Agent, or Firm* — JCIPRNET

(57) ABSTRACT

An appearance inspection system includes a setting part, a movement mechanism, and a control part. The setting part sets a route passing through a plurality of imaging positions in order. The setting part sets the route so that a first time necessary for the movement mechanism to move an imaging device from a first imaging position to a second imaging position among the plurality of imaging positions is longer than a second time necessary for a process of changing a first imaging condition corresponding to the first imaging position to a second imaging condition corresponding to the second imaging position by the control part. The control part starts the process of changing the first imaging condition to the second imaging condition earlier by the second time or more than a scheduled time at which the imaging device arrives at the second imaging position.

18 Claims, 12 Drawing Sheets

(52) U.S. Cl.
CPC ............... *H04N 5/23216* (2013.01); *G05B 2219/37063* (2013.01); *G05B 2219/37206* (2013.01); *G05B 2219/37584* (2013.01); *G05B 2219/40463* (2013.01); *G05B 2219/40565* (2013.01); *G05B 2219/40613* (2013.01)

(58) Field of Classification Search
CPC ........... G05B 2219/37584; G05B 2219/40565; G05B 2219/40463; G05B 2219/40613; G05B 2219/37206; G05B 2219/37063; G01N 21/8851; G01N 21/9515; G01N 21/94
USPC ....................................................... 382/141
See application file for complete search history.

(56) References Cited

U.S. PATENT DOCUMENTS

| | | | | |
|---|---|---|---|---|
| 2014/0176669 | A1* | 6/2014 | Matsumoto | H04N 5/23245 348/36 |
| 2016/0238373 | A1 | 8/2016 | Featherstone | |
| 2016/0379357 | A1 | 12/2016 | Takazawa | |
| 2020/0353620 | A1* | 11/2020 | Hasunuma | B25J 19/023 |

FOREIGN PATENT DOCUMENTS

| | | |
|---|---|---|
| CN | 101339143 | 1/2009 |
| CN | 104020172 | 9/2014 |
| CN | 105044118 | 11/2015 |
| CN | 105793695 | 7/2016 |
| JP | H03247083 | 11/1991 |
| JP | 2003295066 | 10/2003 |
| JP | 2005241310 | 9/2005 |
| JP | 2006148353 | 6/2006 |
| JP | 2006308349 | 11/2006 |
| JP | 2007240434 | 9/2007 |
| JP | 2007248241 | 9/2007 |
| JP | 2016530521 | 9/2016 |
| JP | 2017076169 | 4/2017 |
| JP | 2017146229 | 8/2017 |
| JP | 2017203744 | 11/2017 |
| JP | 2019100887 | 6/2019 |
| WO | 2017065308 | 4/2017 |

OTHER PUBLICATIONS

Office Action of Japan Counterpart Application, with English translation thereof, dated Mar. 2, 2021, pp. 1-8.

Office Action of China Counterpart Application, with English translation thereof, dated Apr. 30, 2021, pp. 1-12.

* cited by examiner

APPEARANCE INSPECTION SYSTEM, IMAGE PROCESSING DEVICE, IMAGING DEVICE, AND INSPECTION METHOD

CROSS-REFERENCE TO RELATED APPLICATION

This application claims the priority of Japan patent application serial no. 2018-044035, filed on Mar. 12, 2018. The entirety of the above-mentioned patent application is hereby incorporated by reference herein and made a part of this specification.

BACKGROUND

Technical Field

The disclosure relates to an appearance inspection system inspecting a target using a captured image and an image processing device, an imaging device, and an inspection method used in the appearance inspection system.

Description of Related Art

Many appearance inspection systems inspecting targets such as resins, metals, and the like using image processing technologies have been proposed.

For example, Japanese Laid-Open No. 2007-248241 (Patent Document 1) discloses an inspection device including an imaging device that images a target, an illumination device that illuminates a field of view of the imaging device, a support device that supports a position and a posture of the target or the imaging device to be changeable, a control device that controls operations of the imaging device and the support device, and an image processing device that performs image processing to take an image generated by the imaging device under illumination of the illumination device for inspection. The control device generates setting information indicating a relation between the imaging device and the target which is satisfied at the time of imaging in imaging performed on the target a plurality of times. Japanese Laid-Open No. 2007-240434 (Patent Document 2) discloses a similar technology.

RELATED ART DOCUMENT(S)

Patent Document(s)

[Patent Document 1] Japanese Patent Application Laid-Open No. 2007-248241
[Patent Document 2] Japanese Patent Application Laid-Open No. 2007-240434

In the above-described inspection devices of the related arts, optimization of an imaging position and a posture is performed for each inspection target position on a target, but a change in an imaging condition (for example, a zoom magnification) when sequentially imaging a plurality of inspection target positions is not considered. When the imaging condition is changed for each inspection target position, the imaging condition is considered to be changed after arrival at an imaging position corresponding to the inspection target position. However, when the imaging condition is changed after the arrival at the imaging position, an inspection time may lengthened since an operation of the imaging device is temporarily stopped.

SUMMARY

According to an example of the disclosure, an appearance inspection system performs appearance inspection by causing an imaging device to image a target when the imaging device arrives at each of a plurality of imaging positions set for the target while moving a relative position of the imaging device with respect to the target. The appearance inspection system includes a setting part, a movement mechanism, and a control part. The setting part sets a route passing through the plurality of imaging positions in order. The movement mechanism moves the relative position of the imaging device with respect to the target along the route. The control part controls an imaging condition of the imaging device. The setting part sets the route so that a first time necessary for the movement mechanism to move the imaging device from a first imaging position to a second imaging position among the plurality of imaging positions is longer than a second time necessary for a process of changing a first imaging condition corresponding to the first imaging position to a second imaging condition corresponding to the second imaging position by the control part. The control part starts the process of changing the first imaging condition to the second imaging condition earlier by the second time or more than a scheduled time at which the imaging device arrives at the second imaging position when the movement mechanism moves the imaging device from the first imaging position to the second imaging position.

According to an example of the disclosure, in an inspection method, appearance inspection is performed by causing an imaging device to image a target when the imaging device arrives at each of a plurality of imaging positions set for the target while moving the imaging device. The inspection method includes setting a route passing through the plurality of imaging positions in order; and moving a relative position of the imaging device with respect to the target along the route and controlling an imaging condition of the imaging device. In the setting of the route, the route is set so that a first time necessary for moving the imaging device from a first imaging position to a second imaging position among the plurality of imaging positions is longer than a second time necessary for a process of changing a first imaging condition corresponding to the first imaging position to a second imaging condition corresponding to the second imaging position. In the controlling of the imaging condition, the process of changing the first imaging condition to the second imaging condition starts earlier by the second time or more than a scheduled time at which the imaging device arrives at the second imaging position.

DESCRIPTION OF THE EMBODIMENTS

Figure 1:
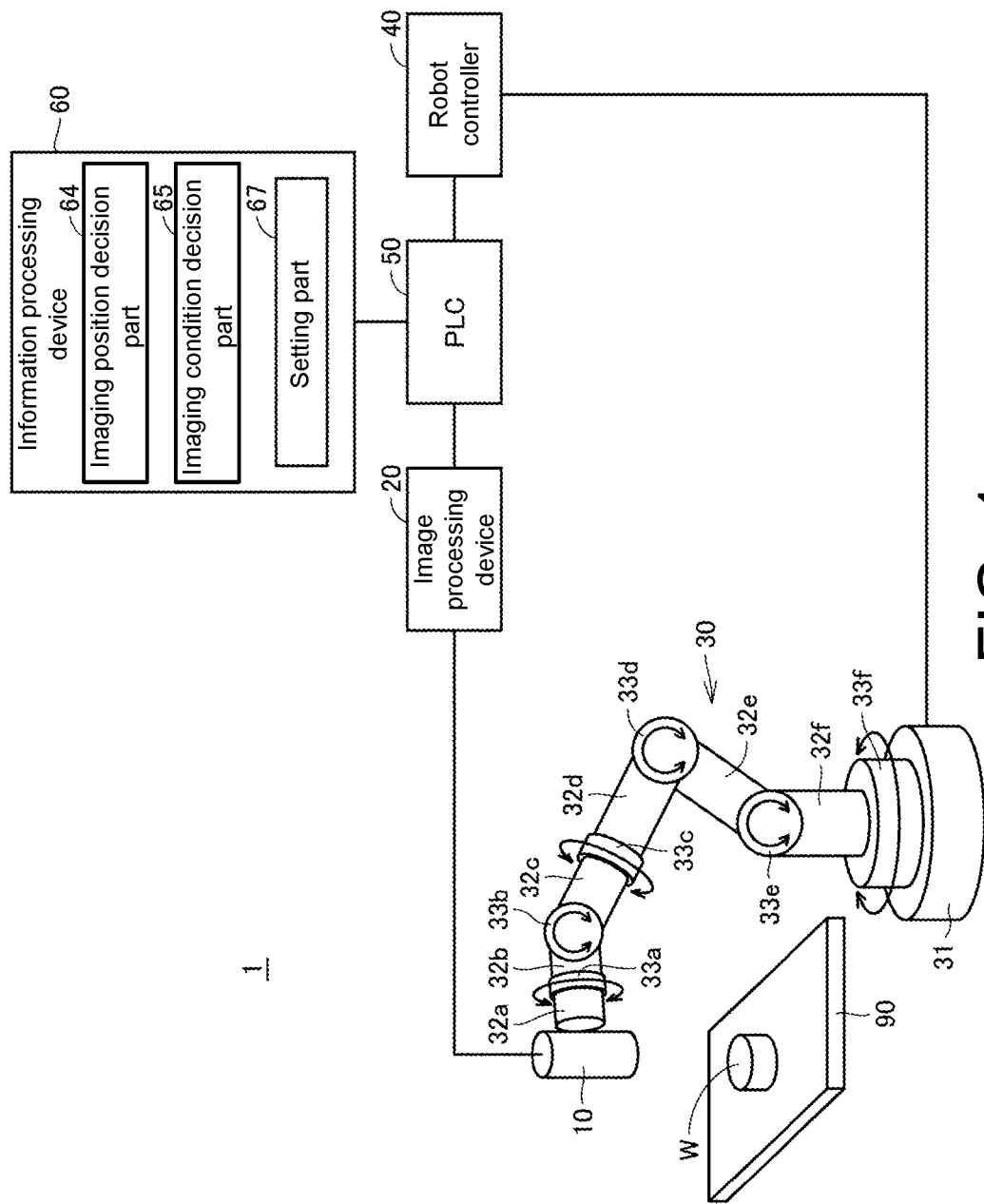
FIG. 1 is a schematic view illustrating an overview of an appearance inspection system according to an embodiment.

An objective of the disclosure is to provide an appearance inspection system capable of shortening an inspection time at the time of imaging of a target from a plurality of imaging positions and an image processing device, an imaging device, and an inspection method used in the appearance inspection system.

According to the example of the disclosure, when the imaging device arrives at the imaging position, the imaging condition of the imaging device is changed to the imaging condition corresponding to the imaging position simultaneously or before the arrival. Therefore, when the imaging device arrives at the imaging position, the imaging by the imaging device can be performed instantly. As a result, it is possible to shorten the inspection time when the target is imaged from the plurality of imaging positions.

According to the above-described example of the disclosure, the appearance inspection system may further include an estimation part that estimates the second time based on pre-decided information indicating a correlation between an imaging condition before a change and an imaging condition after the change, and a time necessary for a process of changing the imaging condition before the change to the imaging condition after the change. According to the example of the disclosure, it is possible to easily estimate the second time based on the information indicating the correlation.

According to the above-described example of the disclosure, the appearance inspection system may further include a notification part that performs error notification when the control part is not able to complete the process of changing the first imaging condition to the second imaging condition by the scheduled time. According to the example of the disclosure, the user can recognize abnormality in the imaging device 10 and perform an appropriate countermeasure such as maintenance.

According to the above-described example of the disclosure, the control part may output a first state signal indicating that an instruction to change an imaging condition of the imaging device is not receivable while the process of changing the first imaging condition to the second imaging condition is performed. According to the example of the disclosure, by checking the first state signal, it is possible to easily recognize the state of the imaging device.

According to the above-described example of the disclosure, the control part may output a second state signal indicating that an imaging instruction to the imaging device is not receivable while the process of changing the first imaging condition to the second imaging condition is performed. According to the example of the disclosure, by checking the second state signal, it is possible to easily recognize the state of the imaging device.

According to an example of the disclosure, an image processing device that is used in the appearance inspection system and determines quality of an appearance of the target by processing an image captured by the imaging device includes the estimation part. Alternatively, an image processing device that is used in the appearance inspection system and determines quality of an appearance of the target by processing an image captured by the imaging device includes at least one of the setting part and the control part. According to the example of the disclosure, the image processing device can determine the quality of the appearance of the target and perform at least some of the processes of setting the designation route.

According to an example of the disclosure, an imaging device that is used in the appearance inspection system includes the estimation part. Alternatively, an imaging device that is used in the appearance inspection system includes at least one of the setting part and the control part. According to the example of the disclosure, the imaging device can image the target and at least execute some of the processes of setting the designation route.

According to the example of the disclosure, it is possible to shorten the inspection time when the target is imaged from the plurality of imaging positions.

According to the example of the disclosure, it is possible to shorten the inspection time when the target is imaged from the plurality of imaging positions.

Embodiments of the disclosure will be described in detail with reference to the drawings. The same reference signs are given to the same or equivalent portions in the drawings and the description thereof will not be repeated.

1. Application Example

First, an example of a scene to which the disclosure is applied will be described with reference to FIG. 1. FIG. 1 is a schematic view illustrating an overview of an appearance inspection system according to an embodiment.

An appearance inspection system 1 according to the embodiment images a plurality of inspection target positions on a workpiece W placed on a stage 90 and inspects the appearance of the workpiece W using the obtained images in, for example, a production line or the like industrial products. In the appearance inspection, injuries, stains, presence or absence of foreign substances, dimensions, and the like of the workpiece W are inspected.

When the appearance inspection of the workpiece W place on the stage 90 is completed, a subsequent workpiece W is transported on the stage 90. At this time, the workpiece W is placed at a pre-decided posture at a pre-decided position on the stage 90.

As illustrated in FIG. 1, the appearance inspection system 1 includes an imaging device 10, an image processing device 20, a robot 30, a robot controller 40, a programmable logic controller (PLC) 50, and an information processing device 60.

The imaging device 10 images a subject which is within an imaging field of view in response to an imaging trigger (imaging instruction) from the image processing device 20 to generate image data and images the workpiece W which is an appearance inspection target as a subject. An imaging condition of the imaging device 10 is variable.

The information processing device 60 is a device that performs various kinds of information processing. The information processing device 60 includes an imaging position decision unit 64, an imaging condition decision unit 65, and a setting part 67.

The imaging position decision unit 64 decides a position (imaging position) and a posture of the imaging device 10 corresponding to each of a plurality of inspection target positions on the workpiece W.

The imaging condition decision unit 65 decides an imaging condition for imaging a corresponding inspection target position from the imaging position with regard to each of a plurality of imaging positions. Examples of the imaging condition include a focus position, a zoom magnification (focal distance), a diaphragm, a shutter speed, a resolution, a gain, and an illumination luminescent color.

The setting part 67 sets a route (designation route) of the imaging device 10 passing through the plurality of imaging positions in order.

The imaging position decision unit 64, the imaging condition decision unit 65, and the setting part 67 decide an imaging position and an imaging condition, and a designation route appropriate for the workpiece W when it is necessary to inspect the appearance of a new product or a new type of workpiece W, respectively.

The robot 30 is a movement mechanism that moves the imaging device 10 and is, for example, a vertically articulated robot in which a plurality of arms 32a to 32f on a base 31 are connected. The robot 30 includes six rotational shafts 33a to 33f. The arm 32a and the arm 32b are connected by the rotational shaft 33a. The arm 32b and the arm 32c are connected by the rotational shaft 33b. The arm 32c and the arm 32d are connected by the rotational shaft 33c. The arm 32d and the arm 32e are connected by the rotational shaft 33d. The arm 32e and the arm 32f are connected by the rotational shaft 33e. The arm 32f and the base 31 are connected by the rotational shaft 33f. The imaging device 10 is mounted at the distal end of the arm 32a. The robot controller 40 controls the robot 30 such that the imaging device 10 is located at coordinate values instructed from the PLC 50 and changes a relative position of the imaging device 10 with respect to the workpiece W. Further, the robot controller 40 controls the robot 30 to change the posture of the imaging device 10 with respect to the workpiece W so that an optical axis of the imaging device 10 matches in a direction instructed from the PLC 50.

As described above, the workpiece W is placed at the pre-decided posture at the pre-decided position on the stage 90. Therefore, the robot 30 can change the relative position and the posture of the imaging device 10 with respect to the workpiece W by changing the relative position and the posture of the imaging device 10 with respect to the stage 90. That is, the robot 30 can change the relative position and the posture of the imaging device 10 with respect to the workpiece W by moving the imaging device 10 using a coordinate system in which a point on the stage 90 is the origin.

The PLC 50 controls the robot controller 40 and the image processing device 20 such that the imaging device 10 sequentially performs imaging at the plurality of imaging positions. The PLC 50 controls the robot controller 40 such that the imaging device 10 is continuously moved along a designation route set by the setting part 67. Thus, the robot 30 moves continuously the imaging device 10 along the designation route.

Further, the PLC 50 controls the image processing device 20 such that an imaging trigger is output at a timing at which the imaging device 10 arrives at the imaging position. Thus, the plurality of inspection target positions can be sequentially imaged while continuously moving the imaging device 10.

The image processing device 20 outputs an imaging trigger to the imaging device 10 in response to an instruction from the PLC 50 when the imaging device 10 arrives at the imaging position. The image processing device 20 acquires image data generated by the imaging device 10. The image processing device 20 determines quality of the appearance of the workpiece W by performing a process decided in advance on the acquired image data.

The image processing device 20 outputs an instruction to change the imaging condition (a condition changing instruction) into an imaging condition corresponding to a subsequent imaging position in response to an instruction from the PLC 50 to the imaging device 10 when an exposure process of the imaging device 10 is completed. Information indicating the imaging condition corresponding to the subsequent imaging position is added to the condition changing instruction.

Figure 2:
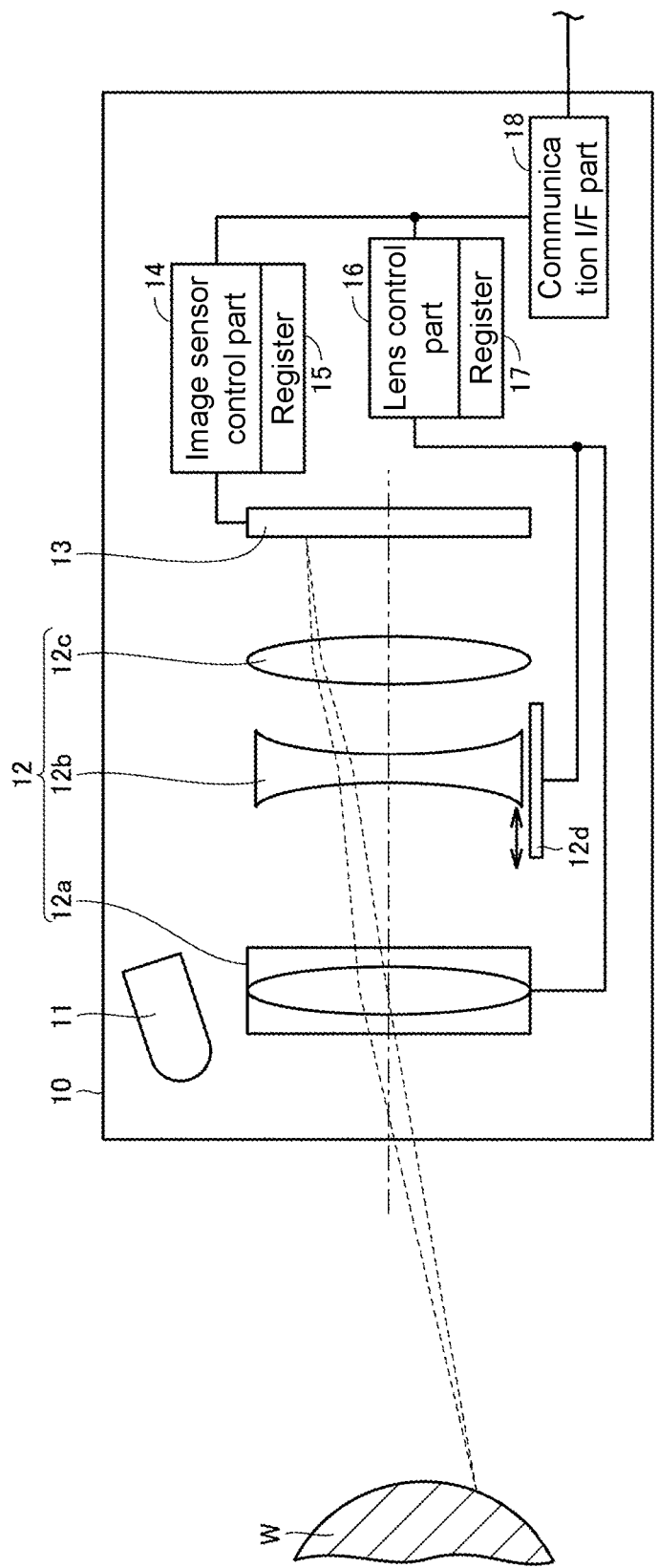
FIG. 2 is a diagram illustrating an example of an internal configuration of an imaging device.

FIG. 2 is a diagram illustrating an example of an internal configuration of an imaging device. As illustrated in FIG. 2, the imaging device 10 includes an illumination part 11, a lens module 12, an image sensor 13, an image sensor control part 14, a lens control part 16, registers 15 and 17, and a communication I/F part 18.

The illumination part 11 radiates light to the workpiece W. The light radiated from the illumination part 11 is reflected from the surface of the workpiece W and is incident on the lens module 12.

The illumination part 11 may include a plurality of illumination elements which are each controlled to be turned on independently. In this case, the imaging condition may include an illumination pattern indicating an illumination element which is turned on among the plurality of illumination elements.

The lens module 12 forms the light reflected from the workpiece W on the image sensor 13. The lens module 12 includes a focus position adjustment lens 12a, a zoom adjustment lens group 12b, a fixed lens 12c, and a movable part 12d. The focus position adjustment lens 12a is a lens that changes a focus position. The zoom adjustment lens group 12b is a lens group that adjusts a zoom magnification by changing a focal distance. The zoom adjustment lens group 12b is installed in the movable part 12d and is movable in an optical axis direction. The fixed lens 12c is a lens that is fixed at a pre-decided position inside the imaging device 10. In the example illustrated in FIG. 2, the focus position adjustment lens 12a, the zoom adjustment lens group 12b, and the fixed lens 12c are arranged in this order. However, the arrangement order of the focus position adjustment lens 12a, the zoom adjustment lens group 12b, and the fixed lens 12c are not limited thereto.

The image sensor 13 is, for example, a photoelectric conversion element such as a complementary metal oxide semiconductor (CMOS) image sensor and converts light from the imaging field of view into an image signal.

The image sensor control part 14 performs an imaging process when an imaging trigger is received from the image processing device 20 via the communication I/F part 18. At this time, the image sensor control part 14 controls a shutter (not illustrated) such that a shutter speed (exposure time) corresponding to the imaging position is achieved. The shutter may be either a mechanical shutter or an electronic shutter. Information indicating the shutter speed corresponding to the imaging position is stored in advance in the register 15. The image sensor control part 14 generates image data based on an amount of charge accumulated in the image sensor 13 and outputs the generated image data to the image processing device 20 via the communication I/F part 18.

When a condition changing instruction is received from the image processing device 20 via the communication I/F part 18, the image sensor control part 14 updates the information indicating the shutter speed stored by the register 15 to information indicating a shutter speed corresponding to a subsequent imaging position in accordance with information added to the condition changing instruction.

The lens control part 16 controls optical characteristics of the lens module 12 in response to a command stored by the register 17. For example, the lens control part 16 controls the focus position adjustment lens 12a such that the focus position is a focus position corresponding to the subsequent imaging position. Further, the lens control part 16 controls the movable part 12d and adjusts the position of the zoom adjustment lens group 12b so that the zoom magnification is a zoom magnification corresponding to the subsequent imaging position.

When a condition changing instruction is received from the image processing device 20 via the communication I/F part 18, the lens control part 16 updates the information indicating the focus position and the zoom magnification stored by the register 17 in accordance with information added at the time of the condition changing instruction and starts a process of changing the focus position and the zoom magnification.

Figure 3:
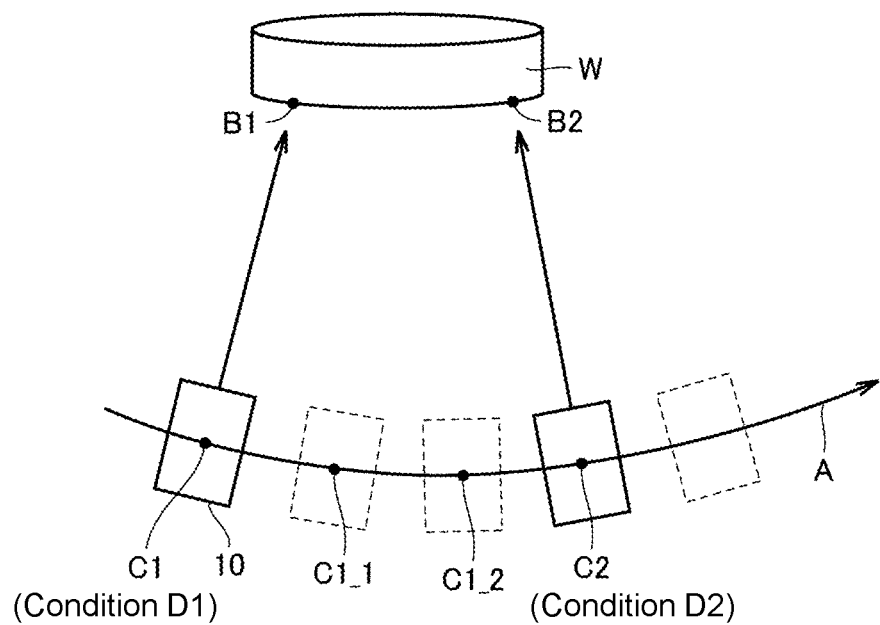
FIG. 3 is a diagram illustrating an example of a designation route set by an information processing device.

FIG. 3 is a diagram illustrating an example of a designation route set by the information processing device. As illustrated in FIG. 3, the imaging position decision unit 64 of the information processing device 60 decides imaging positions C1 and C2 corresponding to the inspection target positions B1 and B2 on the workpiece W. The imaging condition decision unit 65 decides an imaging condition D1 for imaging the inspection target position B1 from the imaging position C1 with regard to the imaging position C1. Similarly, the imaging condition decision unit 65 decides an imaging condition D2 for imaging the inspection target position B2 from the imaging position C2 with regard to the imaging position C2.

The setting part 67 sets the designation route A passing through the imaging positions C1 and C2 in order. The setting part 67 sets the designation route A so that a time T1 necessary to move the imaging device 10 from the imaging position C1 to the imaging position C2 is longer than a time T2 necessary for a process of changing the imaging condition D1 to the imaging condition D2 by the image sensor control part 14 and the lens control part 16.

The image sensor control part 14 and the lens control part 16 starts the process of changing the imaging condition D1 to the imaging condition D2 earlier by the time T2 or more than a scheduled time at which the imaging device 10 arrives at the imaging position C2 when the imaging device 10 is moved along the designation route A. In the example illustrated in FIG. 3, the image sensor control part 14 and the lens control part 16 start the process of changing the imaging condition D1 to the imaging condition D2 when the imaging device 10 arrives at a position C1_1. A time necessary to move the imaging device 10 from the position C1_1 to the imaging position C2 along the designation route A is the time T2 or more.

According to the configuration of the embodiment, when the imaging device 10 arrives at the imaging position C2, the imaging condition of the imaging device 10 is changed to the imaging condition D2 corresponding to the imaging position C2 simultaneously or before the arrival. In the example illustrated in FIG. 3, the process of changing the imaging condition D1 to the imaging condition D2 is completed when the imaging device 10 arrives at the position C1_2 before the imaging position C2. Therefore, when the imaging device 10 arrives at the imaging position C2, it is possible to instantly perform imaging of the inspection target position B2 by the imaging device 10. As a result, it is possible to shorten an inspection time in the case of imaging from the plurality of imaging positions on the workpiece W.

2. Specific Example

Next, an example of the appearance inspection system according to the embodiment will be described.
(A. Focus Position Adjustment Lens)

Figure 4:
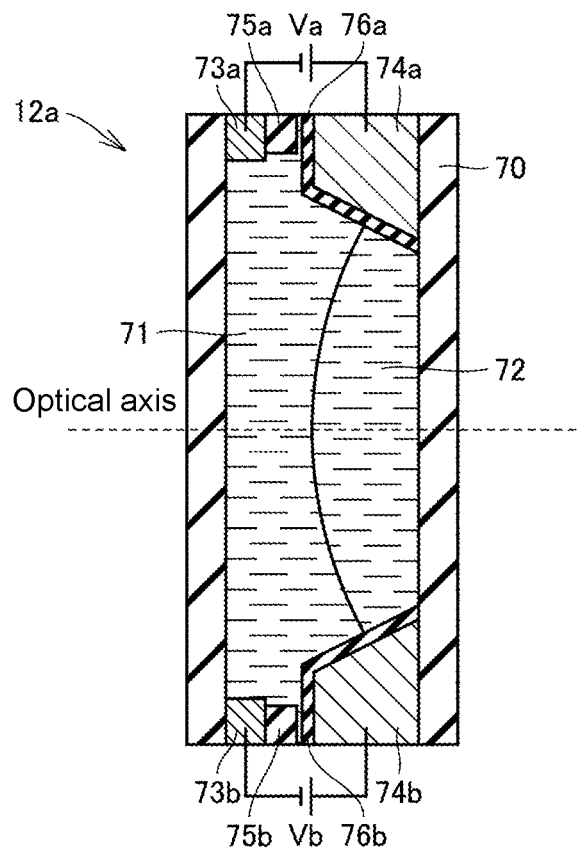
FIG. 4 is a diagram illustrating an example of a focus position adjustment lens.

FIG. 4 is a diagram illustrating an example of a focus position adjustment lens. In the example illustrated in FIG. 4, the focus position adjustment lens 12a is a liquid lens and includes a transparent container 70, electrodes 73a, 73b, 74a, and 74b, insulators 75a and 75b, and insulation layers 76a and 76b.

A closed space in the transparent container 70 is filled with a conductive liquid 71 such as water and an insulation liquid 72 such as oil. The conductive liquid 71 and the insulation liquid 72 are not mixed and have mutually different refractive indexes.

The electrodes 73a and 73b are fixed between the insulators 75a and 75b and the transparent container 70, respectively, and are located in the conductive liquid 71.

The electrodes 74a and 74b are disposed near an end of an interface between the conductive liquid 71 and the insulation liquid 72. The insulation layer 76a is interposed between the insulation liquid 72 and the conductive liquid 71 and the electrode 74a. The insulation layer 76b is interposed between the insulation liquid 72 and the conductive liquid 71 and the electrode 74b. The electrodes 74a and 74b are disposed at a position symmetric to an optical axis of the focus position adjustment lens 12a.

When a voltage Va is applied between the electrodes 74a and 73a, the conductive liquid 71 is pulled by the electrode 74a. Similarly, when a voltage Vb is applied between the electrodes 74b and 73b, the conductive liquid 71 is pulled by the electrode 74b. Thus, a curvature of the interface between the conductive liquid 71 and the insulation liquid 72 is changed. Since the refractive indexes of the conductive liquid 71 and the insulation liquid 72 are different, a focus position of the focus position adjustment lens 12a is changed when the curvature of the interface between the conductive liquid 71 and the insulation liquid 72 is changed. The curvature of the interface depends on magnitudes of the voltages Va and Vb. Therefore, by changing the magnitudes of the voltages Va and Vb, it is possible to adjust the focus position of the focus position adjustment lens 12a to a desired position.

Normally, the voltages Va and Vb are controlled to an equal value. Thus, the interface between the conductive liquid 71 and the insulation liquid 72 is changed to be symmetric to the optical axis. However, the voltages Va and Vb may be controlled to different values. Thus, the interface between the conductive liquid 71 and the insulation liquid 72 may be asymmetric to the optical axis and a direction of the imaging field of view of the imaging device 10 can be changed.

Figure 5:
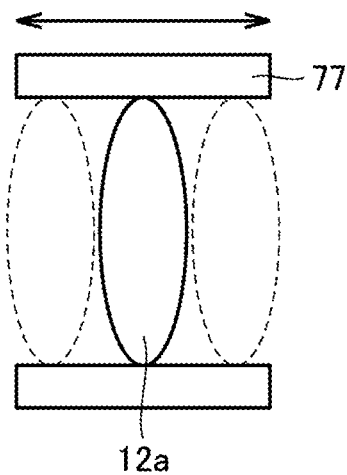
FIG. 5 is a diagram illustrating another example of the focus position adjustment lens.

FIG. 5 is a diagram illustrating another example of the focus position adjustment lens. The focus position adjustment lens 12a in the example illustrated in FIG. 5 is supported by a slide member 77 parallel to the optical axis and is movable along the slide member 77. By changing the position of the focus position adjustment lens 12a, it is possible to adjust the focus position of the focus position adjustment lens 12a to a desired position.

(B. Image Sensor Control Part and Lens Control Part)

The image sensor control part 14 and the lens control part 16 include, for example, microcomputers and perform control processes on the image sensor 13 and the lens module 12, respectively.

Further, the image sensor control part 14 and the lens control part 16 switch states of a READY1 signal and a READY2 signal (an ON state or an OFF state) output from the imaging device 10 to the image processing device 20. The READY1 signal is a signal indicating whether the imaging device 10 can receive a condition changing instruction. The READY2 signal is a signal indicating whether the imaging device 10 can receive an imaging trigger. The ON state indicates that the signal is not receivable and the OFF state indicates that the signal is receivable.

The image sensor control part 14 performs an imaging process when an imaging trigger is received, as described above. The imaging process includes, for example, a process of opening the shutter (not illustrated) (an exposure process) and an image generation process. The image generation process includes a process of reading an amount of charges of each pixel of the image sensor 13, a process of performing A/D conversion on the amount of charges, a process of generating image data in which luminance calculated based on the amount of charges is arranged for each pixel, and a process of transmitting the image data to the image processing device 20 via the communication I/F part 18.

The image sensor control part 14 switches the READY2 signal to the ON state while the imaging process is performed.

When the condition changing instruction is received from the image processing device 20, as described above, the lens control part 16 controls the focus position adjustment lens 12a and the movable part 12d in accordance with information added to the condition changing instruction.

The lens control part 16 switches the READY1 signal and the READY2 signal to the ON state while the focus position and the zoom magnification are being changed by controlling the focus position adjustment lens 12a and the movable part 12d.

(C. Internal Configuration of Information Processing Device)

Figure 6:
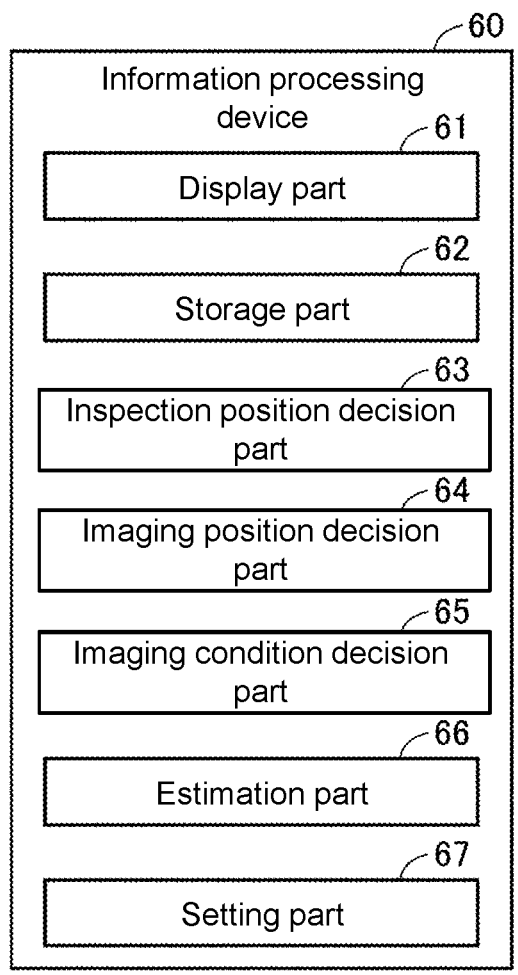
FIG. 6 is a block diagram illustrating an example of an internal configuration of the information processing device.

FIG. 6 is a block diagram illustrating an example of an internal configuration of the information processing device. The information processing device 60 in the example illustrated in FIG. 6 includes a display part 61, a storage part 62, an inspection position decision part 63, and an estimation part 66 in addition to the imaging position decision unit 64, the imaging condition decision unit 65, and the setting part 67. The display part 61 is, for example, a touch panel. The storage part 62 is, for example, an auxiliary storage device such as a hard disk drive or a solid-state drive and stores processing programs to be executed by the inspection position decision part 63, the imaging position decision unit 64, the imaging condition decision unit 65, the estimation part 66, and the setting part 67 and data indicating information regarding setting of the designation route, and the like.

The inspection position decision part 63 reads 3-dimensional design data (for example, computer-aided design (CAD) data) indicating the designed surface of the workpiece W stored in the storage part 62 and decides a plurality of inspection target positions on the surface indicated by the 3-dimensional setting data in accordance with an input by a user.

With regard to each of the plurality of inspection target positions decided by the inspection position decision part 63, the imaging position decision unit 64 decides a position (imaging position) and a posture of the imaging device 10 which can be imaged in focus on the inspection target position. Further, the imaging position decision unit 64 decides an order in which the imaging device passes through the plurality of imaging positions.

The imaging position decision unit 64 decides imaging positions in a movable range of the imaging device 10 based on the shape of the workpiece W and an obstacle object near the workpiece W. For example, when a depression is formed on the surface of the workpiece W and an inspection target position is decided on the bottom of the depression, the imaging position decision unit 64 decides the imaging positions so that a portion around the depression on the workpiece W does not interfere with the imaging device 10. Further, when there is an obstacle object near the workpiece W, the imaging position decision unit 64 decides the imaging positions so that the obstacle object does not interfere with the imaging device 10. When the user inputs information (coordinate values) indicating a location of the obstacle object to the information processing device 60, the imaging position decision unit 64 can recognize the location of the obstacle object.

The imaging condition decision unit 65 decides an imaging condition for imaging a corresponding inspection target position from the imaging position with respect to each imaging position decided by the imaging position decision unit 64. For example, the imaging condition decision unit 65 decides the imaging condition based on a distance between the imaging position and the corresponding inspection target position, the shape of the workpiece W, or the like.

The estimation part 66 estimates a time $T2\_i$ necessary for a process of changing an imaging condition $Di$ corresponding to an i-th imaging position $Ci$ to an imaging condition $D(i+1)$ corresponding to an $(i+1)$-th imaging position $C(i+1)$. A process of changing various parameters included in the imaging condition is performed in parallel. Since a change in a shutter speed and a resolution does not involve a physical change, the change in the shutter speed and the resolution is generally performed in a short time. On the other hand, since a change in a focus position and a zoom magnification involves a physical change, it takes some time. Therefore, the time $T2\_i$ necessary for the process of changing the imaging condition $Di$ to the imaging condition $D(i+1)$ is a time which is the longest in the time necessary to change the various parameters.

The estimation part 66 estimates the time $T2\_i$ using Expression (1) below, for example.

$$T2\_i = f(Di, D(i+1), E) \qquad (1)$$

E is an environment variable and is, for example, temperature or humidity. The estimation part 66 may acquire a measurement value measured by a temperature and humidity meter (not illustrated) installed in the imaging device 10 as a value of E. A function f may be derived theoretically or may be derived experimentally. When the function f is derived experimentally, a correspondent relation between $T2\_i$ and a combination of various $Di$, $D(i+1)$, and E are experimentally obtained and an approximation expression indicating the correspondent relation is set as the function f.

The estimation part 66 may estimate the time $T2\_i$ using a table instead of Expression (1).

Further, the estimation part 66 estimates a time $T3\_i$ necessary for an imaging process corresponding to the imaging condition Di.

The time $T3\_i$ largely depends on a shutter speed and a resolution. Therefore, the estimation part 66 estimates the time $T3\_i$ based on, for example, the shutter speed and the resolution indicated by the imaging condition Di. The estimation part 66 may estimate the time $T3\_i$ using a function expression as in the time T2 and may estimate the time $T3\_i$ using a table.

The setting part 67 sets a designation route along which the imaging device 10 passes through imaging positions C1 to CN in order so that the time $T1\_i$ in which the imaging device 10 is moved from the imaging position Ci to the imaging position C(i+1) satisfies both $T1\_i > T2\_i$ and $T1\_i > T3\_i$.

The setting part 67 optimizes a route so that a value obtained by a preset evaluation function is the minimum (or the maximum) and sets the route as a designation route. The setting part 67 sets the designation route using a method such as a probabilistic road map (PRM), a rapidly exploring random tree (RRT), or particle swarm optimization (PSO) as an optimization technique.

The setting part 67 generates information indicating the set designation route. The information indicating the designation route includes XYZ coordinate values and $\theta x$, $\theta y$, and $\theta z$ corresponding to each point on the designation route along which the imaging device passes for each given time, XYZ coordinate values and $\theta x$, $\theta y$, and $\theta z$ corresponding to each imaging position, and information indicating an imaging condition corresponding to each imaging position. The XYZ coordinate values are coordinate values in an XYZ coordinate system that has a point on the stage 90 as the origin. $\theta x$ is an angle formed between the X axis and a line obtained by projecting the optical axis of the imaging device 10 to the XY plane, $\theta y$ is an angle formed between the Y axis and a line obtained by projecting the optical axis of the imaging device 10 to the YZ plane, and $\theta z$ is an angle formed between the Z axis and a line obtained by projecting the optical axis of the imaging device 10 to the ZX plane. The setting part 67 may decide $\theta x$, $\theta y$, and $\theta z$ indicating a posture of the imaging device 10 at each point between an i-th imaging position and an i+1-th imaging position on the designation route by interpolation calculation performed using $\theta x i$, $\theta y i$, and $\theta z i$ corresponding to the i-th imaging position and $\theta x(i+1)$, $\theta y(i+1)$, and $\theta z(i+1)$ corresponding to the i+1-th imaging position.

(D. Hardware Configuration of Information Processing Device)

Figure 7:
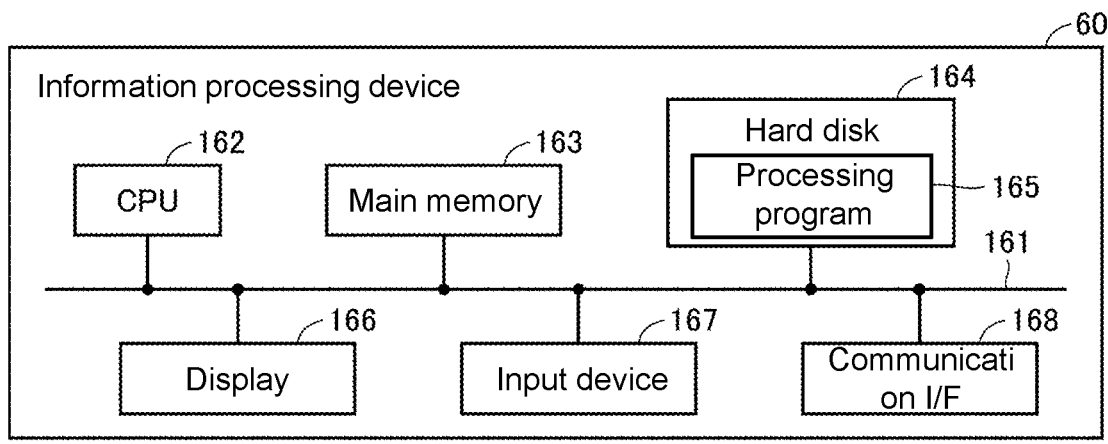
FIG. 7 is a schematic diagram illustrating a hardware configuration of the information processing device.

FIG. 7 is a schematic diagram illustrating a hardware configuration of the information processing device. The information processing device 60 includes a central processing unit (CPU) 162, a main memory 163, a hard disk 164, a display 166, an input device 167, and a communication interface (I/F) 168. These units are connected to be able to mutually perform data communication via a bus 161.

The CPU 162 performs various arithmetic calculations by loading programs (codes) including the processing program 165 installed in the hard disk 164 on the main memory 163 and executing the programs in a predetermined order. The main memory 163 is generally a volatile storage device such as a dynamic random access memory (DRAM).

The hard disk 164 is an internal memory included in the information processing device 60 and a nonvolatile storage device and stores various programs such as the processing program 165. A semiconductor storage device such as a flash memory may be adopted in addition to or instead of the hard disk 164.

The processing program 165 is a program indicating a procedure of processing by the information processing device 60. Various programs such as the processing program 165 may not be necessarily stored in the hard disk 164 and may be stored in a server that can communicate with the information processing device 60 or an external memory which can be directly connected to the information processing device 60. For example, various programs to be executed by the information processing device 60 and various parameters to be used in the various programs are distributed in a stored state in the external memory, and the information processing device 60 reads the various programs and the various parameters from the external memory. The external memory is a medium that stores information such as a program recorded on a computer, another device, a machine, or the like by an electric, magnetic, optical, mechanical, or chemical target operation so that the information is readable. Alternatively, programs or parameters downloaded from a server or the like which is connected to be communicable with the information processing device 60 may be installed in the information processing device 60.

The display 166 is, for example, a liquid crystal display. The input device 167 includes, for example, a mouse, a keyboard, a touchpad, or the like.

The communication I/F 168 exchanges various kinds of data between the PLC 50 and the CPU 162. The communication I/F 168 may exchange data between the server and the CPU 162. The communication I/F 168 includes hardware corresponding to a network for exchanging various kinds of data with the PLC 50.

The display part 61 illustrated in FIG. 6 includes the display 166. The storage part 62 illustrated in FIG. 6 includes the main memory 163 or the hard disk 164. The inspection position decision part 63, the imaging position decision unit 64, the imaging condition decision unit 65, the estimation part 66, and the setting part 67 illustrated in FIG. 6 are realized by the CPU 162, the main memory 163, and the hard disk 164.

The processing program 165 according to the embodiment may be embedded in a part of another program to be provided. Instead, some or all of the processes provided by executing the processing program 165 may be performed by a dedicated hardware circuit.

(E. Flow of Example of Process in Information Processing Device)

Figure 8:
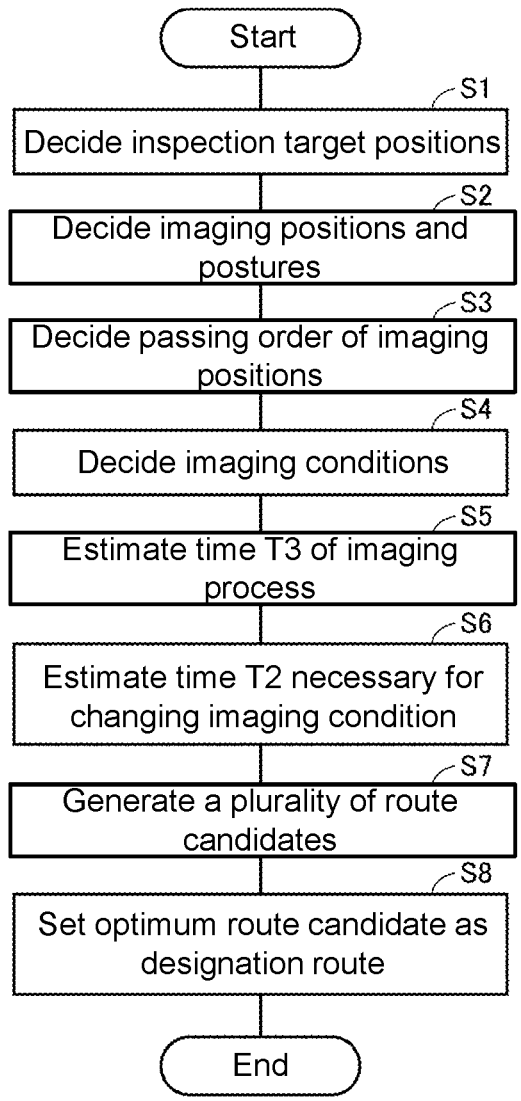
FIG. 8 is a flowchart illustrating an example of a flow of a process in the information processing device.

FIG. 8 is a flowchart illustrating an example of a flow of a process in the information processing device. When it is necessary for the appearance inspection system 1 to inspect the appearance of a new product or a new type of workpiece W, the information processing device 60 performs a process in accordance with, for example, the flowchart illustrated in FIG. 8 to set a designation route of the imaging device 10 appropriate for the new product or the new type of workpiece W. The storage part 62 may store 3-dimensional design data indicating the designed surface of the new product or the new type of workpiece W in advance.

In the example illustrated in FIG. 8, in step S1, the inspection position decision part 63 first decides a plurality of inspection target positions on the workpiece W. Subsequently, in step S2, the imaging position decision unit 64 decides a position (imaging position) and a posture of the imaging device 10 with regard to each of the plurality of inspection target positions. Subsequently, in step S3, the imaging position decision unit 64 decides an order in which the imaging device passes through the plurality of imaging positions. For example, the imaging position decision unit 64 decides a position closest to a default position of the imaging device 10 among the plurality of imaging positions as a first imaging position. The imaging position decision unit 64 decides an imaging position closest to an i-th imaging position (where i is an integer equal to or greater than 1) along the surface of the workpiece W among the imaging positions other than imaging positions up to the i-th imaging position among the plurality of imaging positions as an (i+1)-th imaging position.

Subsequently, in step S4, the imaging condition decision unit 65 decides an imaging condition corresponding to each imaging position.

Subsequently, in step S5, under the imaging condition corresponding to each imaging position, the estimation part 66 estimates the time T3 necessary for the imaging process at the time of the imaging of the imaging condition. In step S6, the estimation part 66 outputs the time T2 necessary for the process of changing the imaging condition corresponding to the previous imaging position to the imaging condition corresponding to the subsequent imaging position with regard to two consecutive imaging positions in the passing order.

Subsequently, in step S7, the setting part 67 generates a plurality of route candidates for passing the imaging positions in the passing order decided in step S3. At this time, the setting part 67 generates the plurality of route candidates so that the time T1 in which the imaging device 10 is moved from the previous imaging position Ci to the subsequent imaging position with regard to two consecutive imaging positions in the passing order satisfies both T1>T2 and T1>T3. In step S8, the setting part 67 sets a route candidate in which the evaluation value is the minimum (or the maximum) among the plurality of route candidates as the designation route and generates information indicating the set designation route.

(F. Method of Deciding Inspection Target Position by Inspection Position Decision Part)

Figure 9:
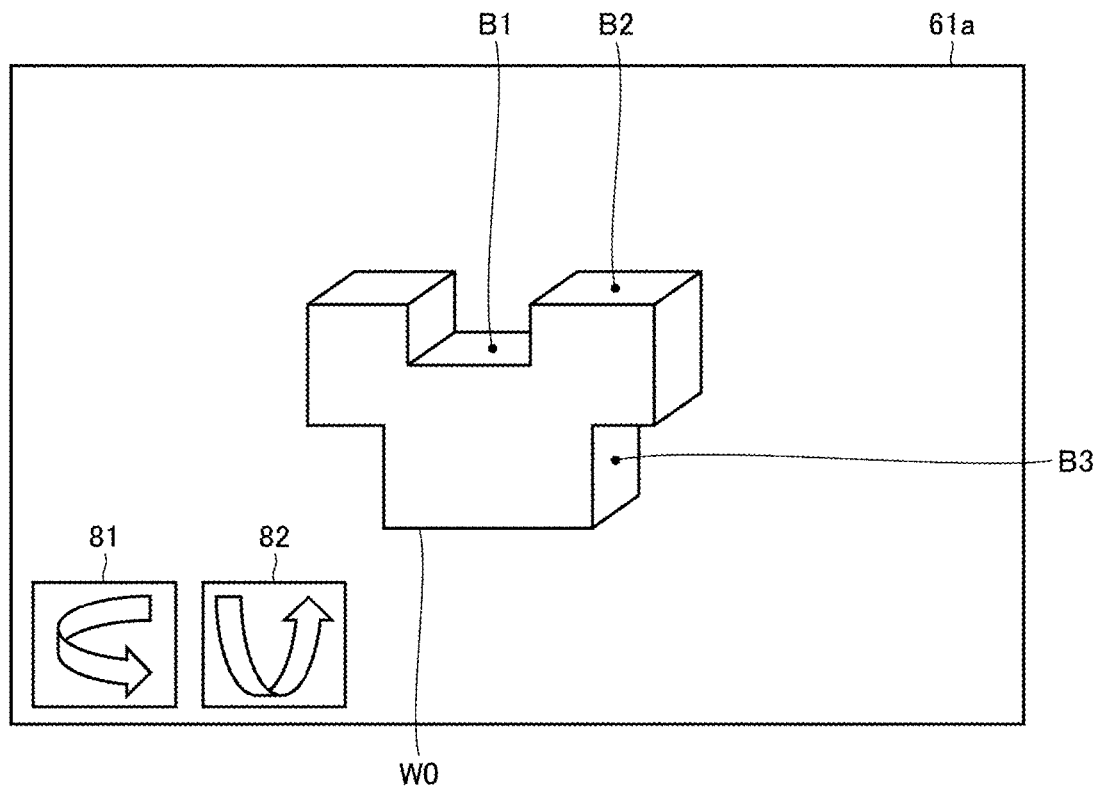
FIG. 9 is a diagram illustrating an example of a screen showing a schematic diagram of a designed appearance of a workpiece.

FIG. 9 is a diagram illustrating an example of a screen showing a schematic diagram of the designed appearance of the workpiece W. The inspection position decision part 63 causes the display part 61 to display a screen 61a including a schematic diagram W0 of the designed appearance indicated by the 3-dimensional design data. The screen 61a includes a tool button 81 for rotating the schematic diagram W0 using the vertical direction as an axis and a tool button 82 for rotating the schematic diagram W0 using the horizontal direction as an axis. The user can appropriately rotate the schematic diagram W0 by operating the tool buttons 81 and 82.

The inspection position decision part 63 receives a designation of a position which the user desires to inspect. Specifically, the user uses the input device 167 to click a plurality of points which the user desires to inspect on the schematic diagram W0 of the workpiece W. The inspection position decision part 63 decides the plurality of points designated on the schematic diagram W0 as a plurality of inspection target positions and finds coordinates of the plurality of inspection target positions. In the example illustrated in FIG. 9, inspection target positions B1 to B3 are decided.

The inspection position decision part 63 converts a coordinate system of the 3-dimensional design data into an XYZ coordinate system that has a point on the stage 90 as the origin on the premise that the workpiece W is placed at a posture decided in advance at a position decided in advance on the stage 90. Therefore, the inspection target position indicates XYZ coordinate values of the XYZ coordinate system that has the point on the stage 90 as the origin.

(G. Method of Deciding Imaging Position by Imaging Position Decision Unit)

The imaging position decision unit 64 decides, for example, one position within a range satisfying Conditions (1) to (4) below as an imaging position with regard to an inspection target position. The imaging position decision unit 64 decides a posture of the imaging device 10 so that a direction oriented from the imaging position to the inspection target position matches the optical axis of the imaging device 10:

Condition (1): a normal line of the surface of the workpiece W passing through the inspection target position or a line inclined by a predetermined angle (for example, 20°) from the normal line. The predetermined angle is set appropriately in accordance with disposition or the like of the illumination part 11, the lens module 12, and the image sensor 13 in the imaging device 10;

Condition (2): an image in which the inspection target position is in focus can be captured by adjusting a focus position by the focus position adjustment lens 12a;

Condition (3): within a movable range by the robot 30; and

Condition (4): a range with a predetermined size including the inspection target position can be set as an imaging field of view by adjusting the zoom magnification by the zoom adjustment lens group 12b.

The imaging position decision unit 64 may decide any one position selected from a plurality of positions arranged as the imaging position when there are a plurality of positions satisfying Conditions (1) to (4). Alternatively, the imaging position decision unit 64 may decide a position closest to the inspection target position of the plurality of positions as the imaging position. Alternatively, the imaging position decision unit 64 decides a position with middle coordinate values among the plurality of positions as the imaging position.

Figure 10:
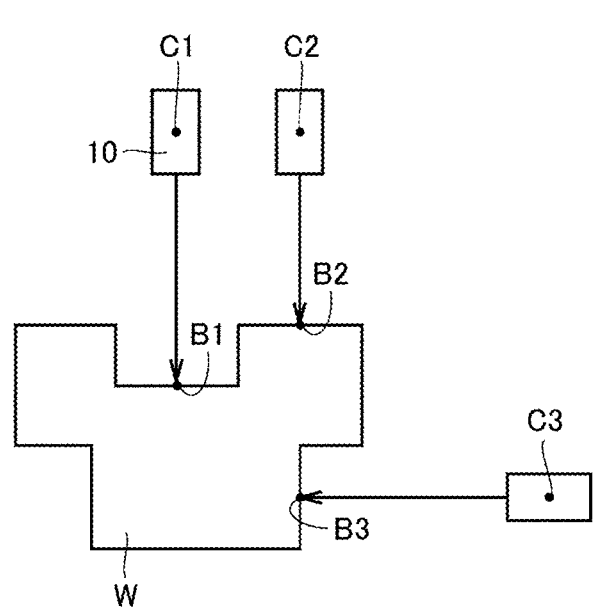
FIG. 10 is a diagram illustrating an example of an imaging position decided by an imaging position decision unit.

FIG. 10 is a diagram illustrating an example of an imaging position decided by an imaging position decision unit. FIG. 10 illustrates imaging positions C1 to C3 decided for the inspection target positions B1 to B3 illustrated in FIG. 9.

An imaging position is indicated with XYZ coordinate values of the XYZ coordinate system that has a point on the stage 90 as the origin. A posture of the imaging device 10 is indicated by the parameters θx, θy, and θz for specifying the direction of the optical axis of the imaging device 10.

Further, the imaging position decision unit 64 decides a passing order by setting the imaging position C1 closest to the default position of the imaging device 10 as the first imaging position, setting the imaging position C2 closest to the imaging position C1 as the second imaging position, and setting the remaining imaging position C3 as the third imaging position.

(H. Method of Deciding Imaging Condition by Imaging Condition Decision Unit)

The imaging condition decision unit 65 decides, for example, a higher zoom magnification as a distance between the imaging position and the inspection target position is longer.

The imaging condition decision unit 65 may decide the zoom magnification for each inspection target position in accordance with an inspection item. For example, the imaging condition decision unit 65 decides a zoom magnification of the inspection target position at which a screw mounting state is set as an inspection item as a relatively low value and decides a zoom magnification of the inspection target position at which a coating hurt is set as an inspection item as a relatively high value. The imaging condition decision unit 65 may decide the zoom magnification in accordance with the inspection item input by the user for each inspection target position.

Further, the imaging condition decision unit 65 may decide a resolution in accordance with the zoom magnification. Further, the imaging condition decision unit 65 may decide a focus position in accordance with a distance between the imaging position and the inspection target position. Further, when a part of the workpiece W is between the illumination part 11 and the inspection target position, since an amount of illumination light arriving at the inspection target position is decreased, the imaging condition decision unit 65 may decide a shutter speed slower than the default (may decide an exposure time longer than the default).

(I. Method of Setting Designation Route by Setting Part)

As described above, the setting part 67 optimizes the route so that a value obtained by a pre-decided evaluation function is the minimum (or the maximum) and sets the designation route. The evaluation function is, for example, a first function indicating a time necessary to pass through all the imaging positions, a second function indicating a spatial length of the route, or a third function indicating a variation amount of a speed of the imaging device 10. By using the first function, the setting part 67 can set a designation route in which a movement time is short or a designation route in which the movement time is the closest to a desired time. By using the second function, the setting part 67 can set a designation route in which a movement amount is small. By using the third function, the setting part 67 can set a designation route in which the imaging device 10 can be moved at a substantially constant speed.

Figure 11B:
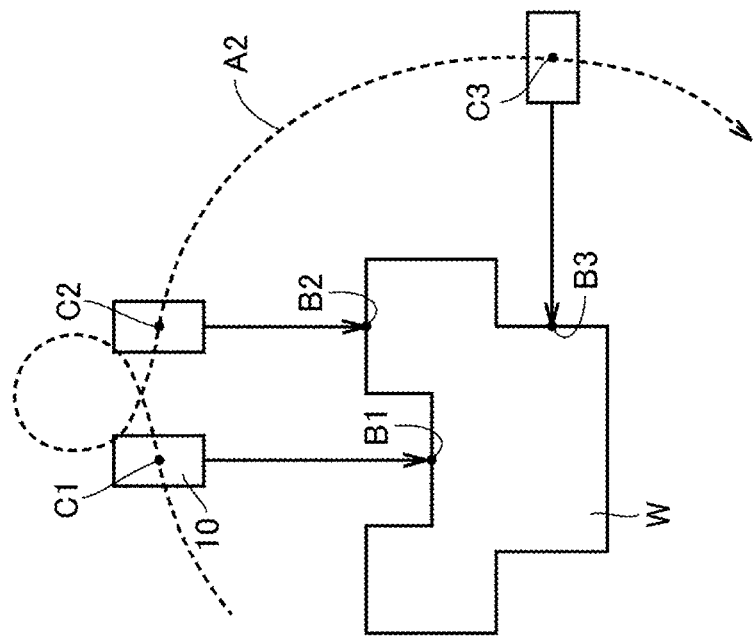
FIG. 11(a) and FIG. 11(b) are diagrams illustrating an example of a designation route set by a setting part.
Figure 11A:
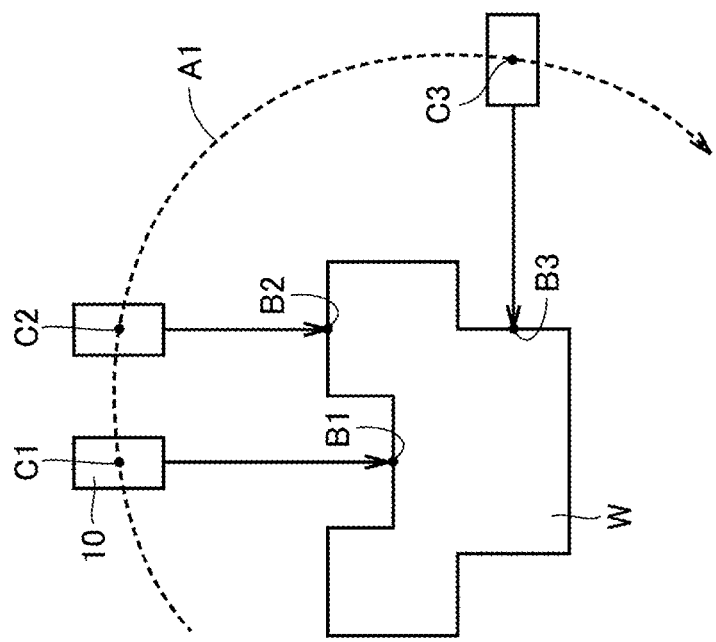

FIG. 11(*a*) and FIG. 11(*b*) are diagrams illustrating an example of a designation route set by a setting part. FIG. 11(*a*) illustrates a designation route A1 set based on an evaluation value calculated using the first function. FIG. 11(*b*) illustrates a designation route A2 set based on an evaluation value calculated using the third function.

The designation route A1 in which the imaging positions C1 to C3 are connected smoothly and at a short distance is set by optimizing the route so that the evaluation value calculated using the first function is the minimum, as illustrated in FIG. 11(*a*). However, to ensure the time T2_1 in which the imaging condition D1 is changed to the imaging condition D2, it is necessary to lower a speed of the imaging device 10 from the imaging position C1 to the imaging position C2.

On the other hand, the designation route A2 in which a route length from the imaging position C1 to the imaging position C2 is long is set by optimizing the route so that the evaluation value calculated using the third function is the minimum, as illustrated in FIG. 11(*b*). The designation route A2 is lengthy at a glance. However, after the imaging device 10 passes through the imaging position C2 while maintaining a substantially constant movement speed, the imaging device 10 can smoothly move toward the imaging position C3.

(J. PLC)

The PLC 50 acquires information indicating the designation route generated by the information processing device 60 and outputs instruction in accordance with the information to the image processing device 20 and the robot controller 40.

The PLC 50 instructs the robot controller 40 of θx, θy, and θz and the XYZ coordinates of each point on the designation route through which the imaging device passes for each given time and which is included in information indicating the designation route generated by the information processing device 60 sequentially at a constant time interval. Thus, the robot controller 40 and the robot 30 move the imaging device 10 to the position of the instructed XYZ coordinate values and change the posture of the imaging device 10 so that the optical axis matches the direction indicated by the instructed θx, θy, and θz.

The PLC 50 acquires the XYZ coordinate values and θx, θy, and θz indicating the actual position and posture of the imaging device 10 from the robot 30 and compares the acquired XYZ coordinate values and θx, θy, and θz with the XYZ coordinate values and θx, θy, and θz of the imaging position. The PLC 50 outputs information indicating the imaging condition corresponding to the subsequent imaging position and an imaging instruction to the image processing device 20 at a timing at which the XYZ coordinate values and θx, θy, and θz acquired from the robot match the XYZ coordinate values and θx, θy, and θz of the imaging position.

(K. Image Processing Device)

The image processing device 20 includes a central processing unit (CPU), a random access memory (RAM), a read-only memory (ROM), an auxiliary storage device, and a communication I/F and performs information processing. The auxiliary storage device includes, for example, a hard disk drive, a solid-state drive, or the like and stores a program or the like to be executed by the CPU.

Figure 12:
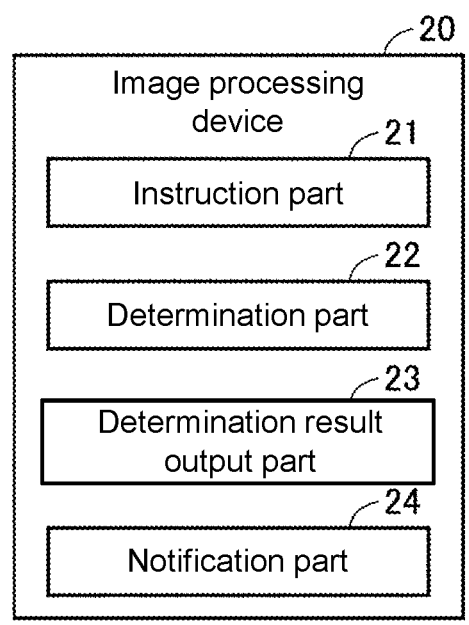
FIG. 12 is a block diagram illustrating an internal configuration of the image processing device.

FIG. 12 is a block diagram illustrating an internal configuration of the image processing device. As illustrated in FIG. 12, the image processing device 20 includes an instruction unit 21, a determination unit 22, a determination result output unit 23, and a notification part 24.

The instruction unit 21 outputs an imaging trigger to the imaging device 10 when an imaging instruction is received from the PLC 50.

Further, the instruction unit 21 outputs a condition changing instruction to the imaging device 10 at a timing that has passed by a pre-decided time after the imaging trigger is output to the imaging device 10. The pre-decided time is a time equal to or greater than a time in which the imaging device 10 completes an exposure process after the imaging trigger is output. Information indicating an imaging condition corresponding to a subsequent imaging position and received from the PLC 50 is added to the condition changing instruction.

The determination unit 22 processes an image captured with regard to an inspection target position and outputs a quality determination result of the inspection target position. For example, the determination unit 22 determines quality of the inspection target position by binarizing a differential image from an image of a good workpiece stored in advance and collating the number of pixels exceeding a threshold with a reference value, as disclosed in, for example, Japanese Patent Application Laid-Open No. 2007-240434.

The determination result output unit 23 displays a determination result by the determination unit 22 on a display device (not illustrated). Alternatively, the determination result output unit 23 may display a determination result on the display part 61 included in the information processing device 60.

The notification part 24 performs an error notification indicating that abnormality occurs in the imaging device 10 when the READY1 signal output from the imaging device 10 is turned on at a timing at which the instruction unit 21 outputs an imaging trigger. The notification part 24 displays, for example, an error screen on the display device (not illustrated). As described above, the designation route is set so that a time $T1\_i$ of movement from the i-th imaging position Ci to the i+1-th imaging position C(i+1) is greater than the time $T2\_i$ necessary for the process of changing the imaging condition Di to the imaging condition D(i+1). Therefore, when the imaging device 10 normally operates, the change to the imaging condition corresponding to the imaging position is completed at a timing at which the imaging device 10 arrives at the imaging position. The fact that the READY1 signal in the ON state indicating that the condition changing instruction is not receivable is output at a timing at which the imaging device 10 arrives at the imaging position means that some abnormality occurs in the imaging device 10.

Further, even when the READY2 signal output from the imaging device 10 is in the ON state at a timing at which the instruction unit 21 outputs an imaging trigger, the notification part 24 may perform error notification indicating that abnormality occurs in the imaging device 10. The fact that the READY2 signal in the ON state indicating that the imaging trigger is not receivable is output at a timing at which the imaging device 10 arrives at the imaging position means that some abnormality occurs in the imaging device 10.

When the notification part 24 performs error notification, the PLC 50 may stop the moving and the imaging of the imaging device 10.

(L. Flow of Inspection Method in Appearance Inspection System)

Figure 13:
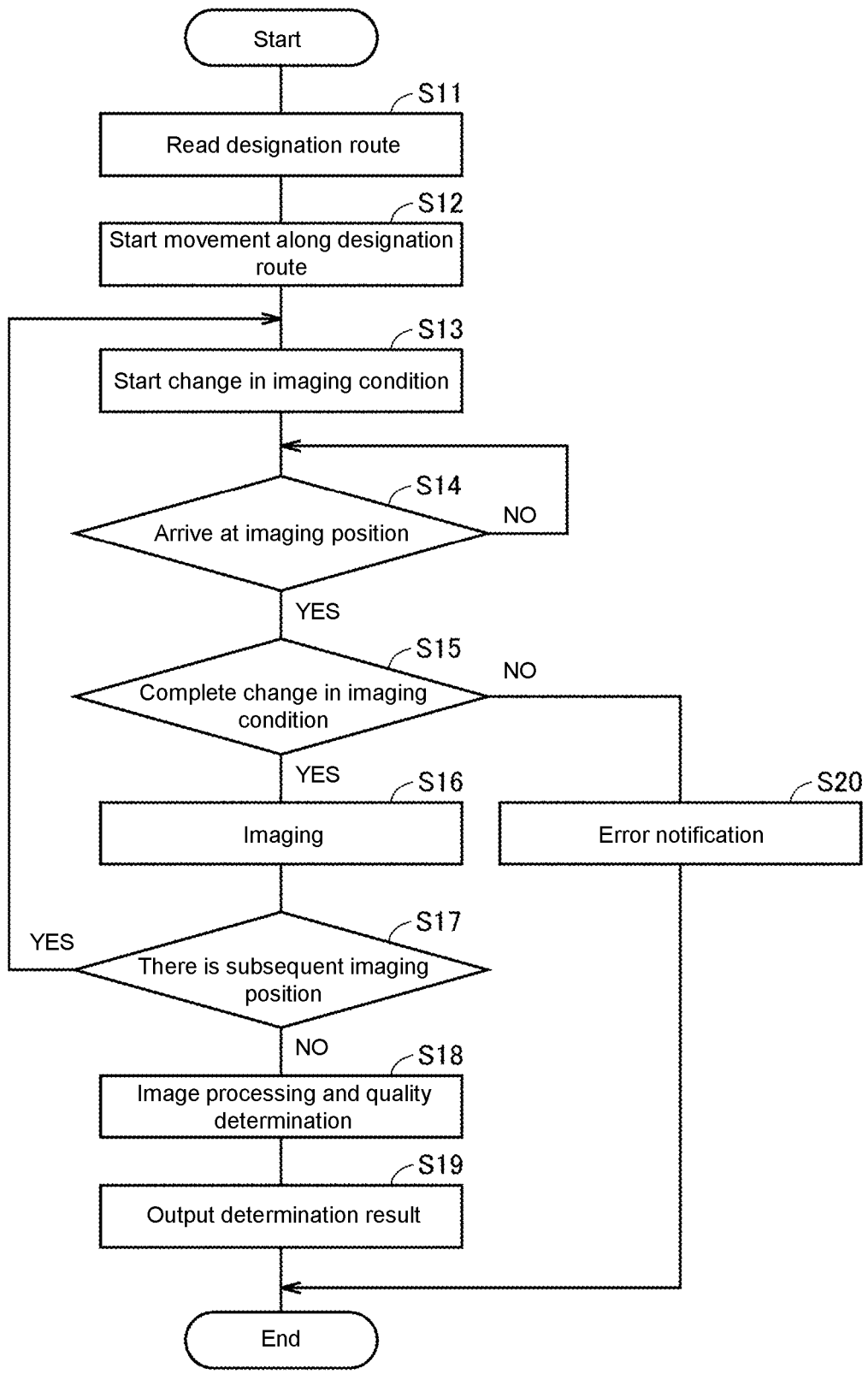
FIG. 13 is a flowchart illustrating an example of a flow of an inspection method in the appearance inspection system.

FIG. 13 is a flowchart illustrating an example of a flow of an inspection method in the appearance inspection system. In the example illustrated in FIG. 13, in step S11, the PLC 50 first reads the information indicating the designation route set by the information processing device 60.

Subsequently, in step S12, the PLC 50 outputs an instruction to move the imaging device 10 along the designation route to the robot controller 40. Thus, the robot 30 starts moving the imaging device 10 along the designation route.

Further, in step S13, the PLC 50 outputs an instruction to change the imaging condition into the imaging condition corresponding to the imaging position to the image processing device 20. Here, the PLC 50 outputs an instruction to change the imaging condition into the imaging condition corresponding to the first imaging condition to the image processing device 20. The image processing device 20 outputs the condition changing instruction to which the information indicating the imaging condition is added to the imaging device 10. Thus, the image sensor control part 14 and the lens control part 16 of the imaging device 10 start the process of changing the imaging condition.

Subsequently, in step S14, it is determined whether the imaging device 10 arrives at the imaging position. When the XYZ coordinate values and θx, θy, and θz of the imaging device 10 match the XYZ coordinate values and θx, θy, and θz of the imaging position, it is determined that the imaging device 10 arrives at the imaging position. When the imaging device 10 does not arrive at the imaging position (NO in step S14), the process returns to step S14. When the imaging device 10 arrives at the imaging position (YES in step S14), the image processing device 20 determines in step S15 whether the process of changing the imaging condition is completed. Specifically, when the READY2 signal output from the imaging device 10 is in the OFF state, the image processing device 20 determines that the process of changing the imaging condition is completed.

When the process of changing the imaging condition is completed (YES in step S15), the image processing device 20 outputs an imaging trigger to the imaging device 10 in step S16. Thus, the imaging device 10 images the workpiece W.

Subsequently, in step S17, the PLC 50 determines whether there is a subsequent imaging position. When there is the subsequent imaging position (YES in step S17), the process returns to step S13 and the process of changing the imaging condition to the imaging condition corresponding to the subsequent imaging position starts. Thereafter, steps S14 to S16 are repeated. By repeating steps S14 to S16, the imaging device 10 sequentially images the plurality of inspection target positions.

When there is no subsequent imaging position (that is, the imaging of all the inspection target positions is completed) (NO in step S17), the image processing device 20 processes the image captured by the imaging device 10 and determines quality of the appearance of the workpiece W in step S18. Subsequently, in step S19, the image processing device 20 outputs a determination result. Thus, the inspection process ends.

Conversely, when the changing of the imaging condition is not completed (NO in step S15), the notification part 24 performs error notification indicating that abnormality occurs in the imaging device 10 in step S20. Further, the PLC 50 stops the operation of each part and ends the inspection process.

Figure 14:
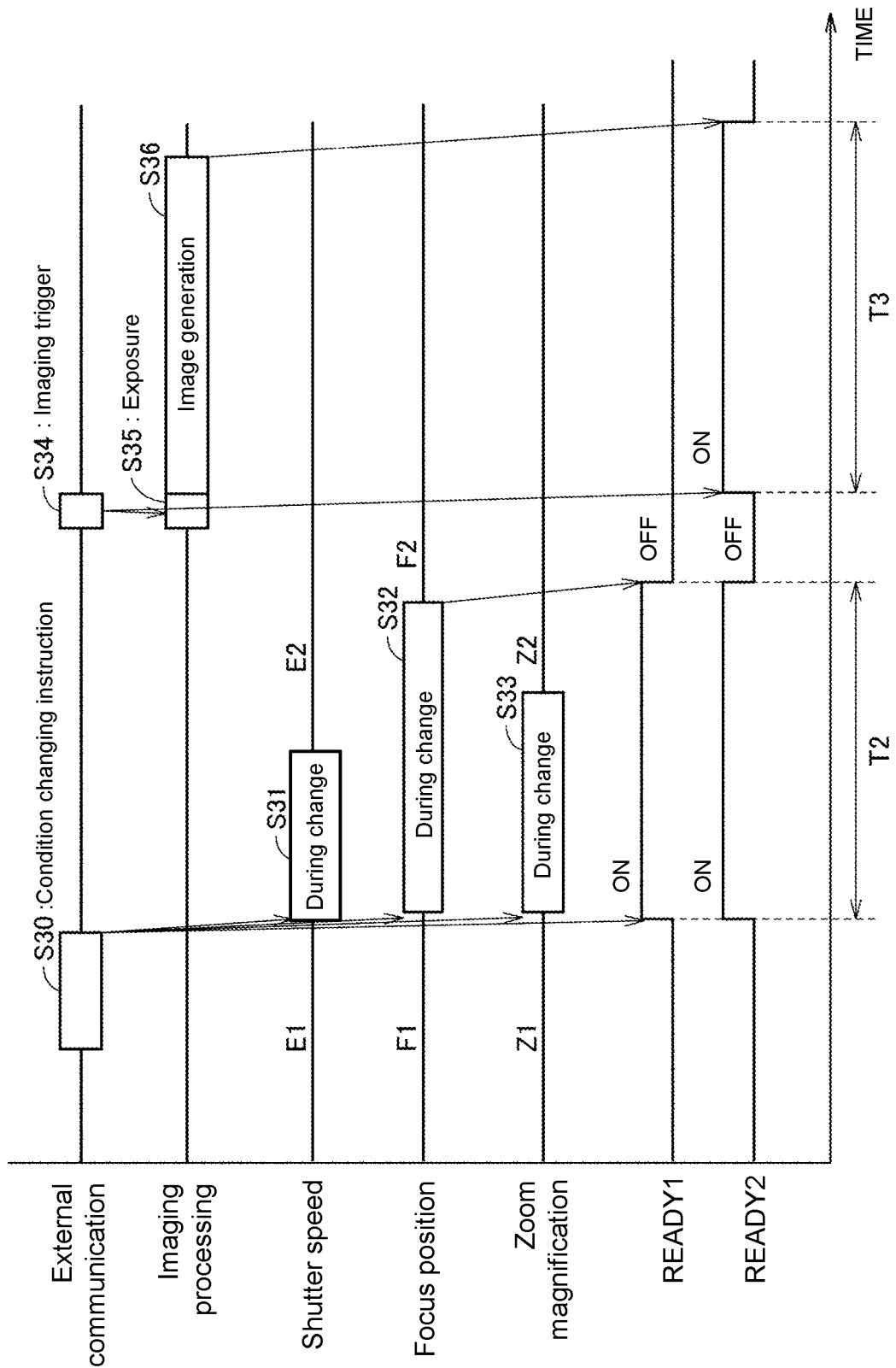
FIG. 14 is a timing chart illustrating a flow of a process in the imaging device.

FIG. 14 is a timing chart illustrating a flow of a process in the imaging device. When the condition changing instruction is received from the image processing device 20 (step S30), the image sensor control part 14 and the lens control part 16 start changing the imaging condition in accordance with the information added to the condition changing instruction. For example, the image sensor control part 14 changes the shutter speed from E1 to E2 (step S31). The lens control part 16 changes the focus position from F1 to F2 (step S32) and changes the zoom magnification from Z1 to Z2 (step S33).

Further, when the condition changing instruction is received, the lens control part 16 switches the READY1 signal and the READY2 signal to the ON state. When the change in all the imaging conditions is completed, the READY1 signal and the READY2 signal are switched to the OFF state.

When the READY1 signal and the READY2 signal are in the OFF state and the imaging trigger is received from the image processing device 20 (step S34), the image sensor control part 14 opens the shutter and performs the exposure process (step S35). Thereafter, the image generation process is performed based on an amount of charges accumulated in each pixel of the image sensor 13 (step S36).

When the imaging trigger is received, the image sensor control part 14 switches the READY2 signal to the ON state. When the image generation process is completed, the image sensor control part 14 switches the READY2 signal to the OFF state.

(M. Modification Examples of Appearance Inspection System)

Figure 15:
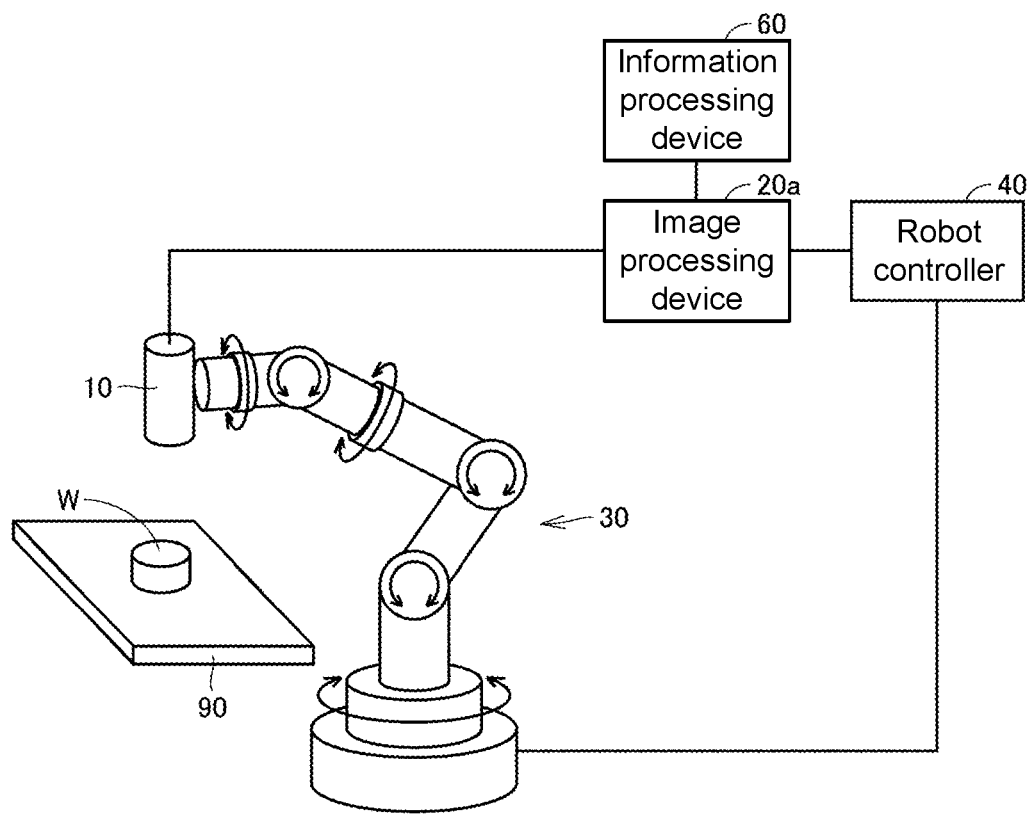
FIG. 15 is a diagram illustrating an appearance inspection system according to a modification example.

FIG. 15 is a diagram illustrating an appearance inspection system according to a modification example. The appearance inspection system illustrated in FIG. 15 is different from the appearance inspection system 1 illustrated in FIG. 1 in that the PLC 50 is not included and an image processing device 20a is included instead of the image processing device 20. The image processing device 20a has both the configuration of the image processing device 20 and the configuration of the PLC 50.

Figure 16:
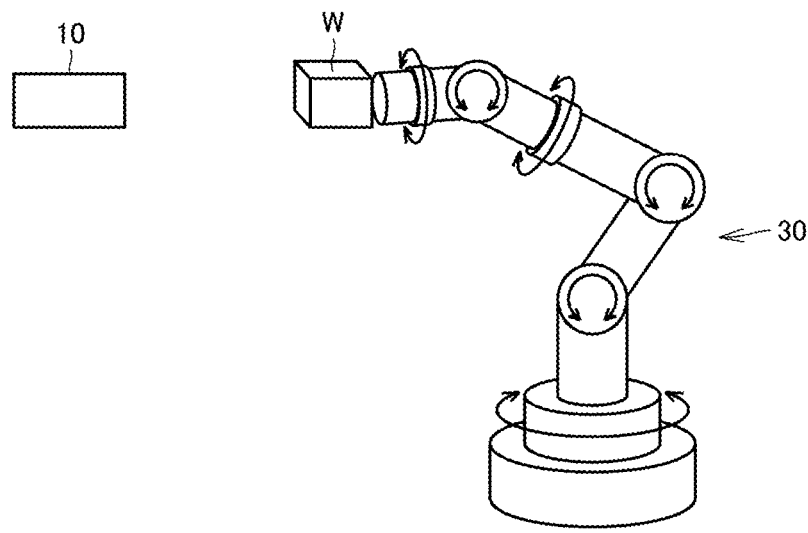
FIG. 16 is a diagram illustrating another form in which a relative position between a workpiece and the imaging device is changed.

FIG. 16 is a diagram illustrating another form in which a relative position between the workpiece W and the imaging device is changed. As illustrated in FIG. 16, the robot 30 may move the workpiece W rather than the imaging device 10. In the example illustrated in FIG. 16, the imaging device 10 is fixed. The relative position between the workpiece W and the imaging device 10 may be changed by moving the workpiece W in this way.

Figure 17:
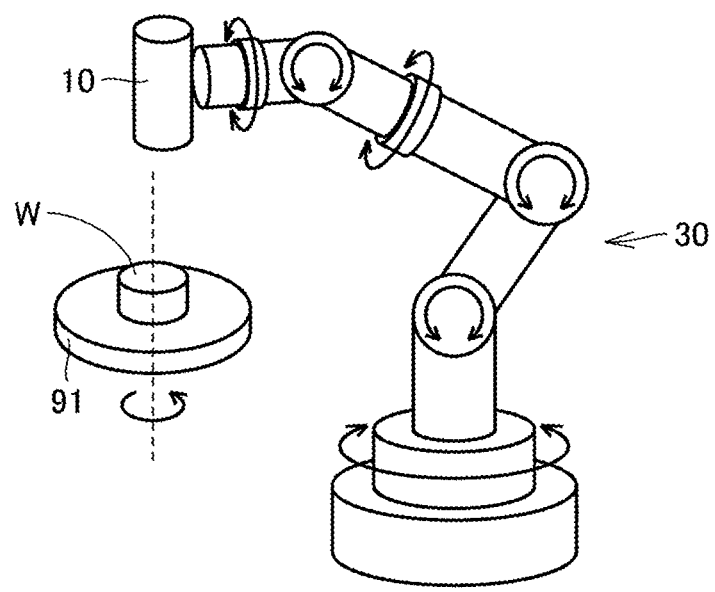
FIG. 17 is a diagram illustrating still another form in which the relative position between the workpiece W and the imaging device is changed.

FIG. 17 is a diagram illustrating still another form in which the relative position between the workpiece W and the imaging device is changed. As illustrated in FIG. 17, the workpiece W may be placed on a rotational table 91. The rotational table 91 rotates in response to an instruction from the robot controller 40. Thus, it is possible to easily change the relative position between the workpiece W and the imaging device 10.

The robot 30 may be a robot (for example, a horizontally articulated robot or an orthogonal robot) other than a vertically articulated robot.

As described above, the image sensor control part 14 and the lens control part 16 are included in the imaging device 10. However, the image sensor control part 14 and the lens control part 16 may be included in the image processing device 20. In this case, the image sensor control part 14 and the lens control part 16 included in the image processing device 20 control the image sensor 13 and the lens module 12, respectively, via the communication I/F part 18 of the imaging device 10.

Further, the image processing device 20 may include each part of the information processing device 60 illustrated in FIG. 6 (the display part 61, the storage part 62, the inspection position decision part 63, the imaging position decision unit 64, the imaging condition decision unit 65, the estimation part 66, and the setting part 67). For example, the image processing device 20 may include at least one of the estimation part 66 and the setting part 67 in the block of the information processing device 60 illustrated in FIG. 6. At this time, as described above, the image sensor control part 14 and the lens control part 16 may be included in the image processing device 20. That is, the image processing device 20 may not include the image sensor control part 14 and the lens control part 16 and may include at least one of the estimation part 66 and the setting part 67. Alternatively, the image processing device 20 may include at least one of the image sensor control part 14 and the lens control part 16, and the estimation part 66 and the setting part 67.

Further, the imaging device 10 may include the storage part 62, the inspection position decision part 63, the imaging position decision unit 64, the imaging condition decision unit 65, the estimation part 66, and the setting part 67 of the information processing device 60 illustrated in FIG. 6. For example, the imaging device 10 may include at least one of the estimation part 66 and the setting part 67 in the block of the information processing device 60 illustrated in FIG. 6. At this time, as described above, the image sensor control part 14 and the lens control part 16 may be included in the image processing device 20. That is, the imaging device 10 may not include the image sensor control part 14 and the lens control part 16 and may include at least one of the estimation part 66 and the setting part 67. Alternatively, the imaging device 10 may include at least one of the image sensor control part 14 and the lens control part 16, and the estimation part 66 and the setting part 67.

As described above, after one imaging position is decided with regard to each inspection target position by the imaging position decision unit 64, the designation route is set based on the evaluation value. However, the plurality of imaging positions may be decided with regard to each inspection target position by the imaging position decision unit 64, one imaging position may be selected from the plurality of imaging positions so that the evaluation value is the minimum (or the maximum), and the designation route passing through the selected imaging position may be set.

As described above, after the order in which the imaging device passes through the plurality of imaging positions is decided by the imaging position decision unit 64, the designation route is set based on the evaluation value. However, the setting part 67 may calculate evaluation values for route candidates when the order in which the imaging device passes through the plurality of imaging positions is different, and may decide the passing order based on the evaluation value.

(N. Operational Effects and Advantages)

As described above, in the appearance inspection system 1 according to the embodiment, when the relative position of the imaging device 10 with respect to the workpiece W is moved, the imaging device 10 images the workpiece W and performs the appearance inspection when the imaging device 10 arrives at each of the plurality of imaging positions. The appearance inspection system 1 includes the setting part 67, the robot 30, the image sensor control part 14, and the lens control part 16. The setting part 67 sets the designation route passing through the plurality of imaging positions passes in order. The robot 30 moves the relative position of the imaging device 10 with respect to the workpiece W along the designation route. The image sensor control part 14 and the lens control part 16 control the imaging condition of the imaging device 10. The setting part 67 sets the designation route so that the time $T1\_i$ is longer than the time $T2\_i$. The time $T1\_i$ is a time necessary for the robot 30 to move the imaging device 10 from the imaging position Ci to the imaging position C(i+1). The time $T2\_i$ is a time necessary for the process of changing the imaging condition Di corresponding to the imaging position Ci to the imaging condition D(i+1) corresponding to the imaging position C(i+1). The image sensor control part 14 and the lens control part 16 start the process of changing the imaging condition Di to the imaging condition D(i+1) earlier by the time $T2\_i$ or more than a scheduled time at which the imaging device 10 arrives at the imaging position C(i+1).

Thus, when the imaging device 10 arrives at the imaging position C(i+1), the imaging condition of the imaging device 10 is changed to the imaging condition D(i+1) corresponding to the imaging position C(i+1) simultaneously or before the arrival. Therefore, when the imaging device 10 arrives at the imaging position C(i+1), the imaging by the imaging device 10 can be performed instantly. As a result, it is possible to shorten the inspection time when the workpiece W is imaged from the plurality of imaging positions.

The appearance inspection system 1 further includes the estimation part 66 that estimates the time $T2\_i$ based on the pre-decided information indicating the correlation between the imaging condition before the change and the imaging condition after the change, and the time necessary for the process of changing the imaging condition before the change to the imaging condition after the change. Thus, it is possible to easily estimate the time $T2\_i$ based on the information indicating the correlation.

The appearance inspection system 1 further includes the notification part 24 that performs error notification when the image sensor control part 14 and the lens control part 16 do not complete the process of changing the imaging condition Di to the imaging condition D(i+1) by the scheduled time. Thus, the user can recognize abnormality in the imaging device 10 and perform an appropriate countermeasure such as maintenance.

The image sensor control part 14 and the lens control part 16 output the READY1 signal indicating whether the condition changing instruction is receivable. The image sensor control part 14 and the lens control part 16 output the READY1 signal indicating that the condition changing instruction is not receivable while performing the process of changing the imaging condition D1 to the imaging condition D2. Thus, by checking the READY1 signal, it is possible to easily recognize the state of the imaging device 10.

Further, the image sensor control part 14 and the lens control part 16 output the READY2 signal indicating whether the imaging trigger is receivable. The image sensor control part 14 and the lens control part 16 output the READY2 signal indicating that the imaging trigger is not receivable while performing the process of changing the imaging condition D1 to the imaging condition D2. Thus, by checking the READY2 signal, it is possible to easily recognize the state of the imaging device 10.

The image processing device 20a may include the estimation part 66. Alternatively, the image processing device 20a may include the setting part 67. Thus, the image processing device 20a can determine the quality of the appearance of the workpiece W and perform at least some of the processes of setting the designation route.

Alternatively, the image processing device 20a may include the setting part 67, the image sensor control part 14, and the lens control part 16. Alternatively, the image processing device 20 may include the image sensor control part 14 and the lens control part 16. Thus, the image processing devices 20 and 20a can determine the quality of the appearance of the workpiece W and perform the process of changing the imaging condition in the imaging device 10.

The imaging device 10 may include the estimation part 66. Alternatively, the imaging device 10 may include the setting part 67. Thus, the imaging device 10 can image the workpiece W and perform at least some of the processes of setting the designation route.

The imaging device 10 includes the image sensor control part 14 and the lens control part 16. Alternatively, the imaging device 10 may include the setting part 67, the image sensor control part 14, and the lens control part 16. Thus, the imaging device 10 can image the workpiece W and perform the process of changing the imaging condition.

(O. Supplements)

As described above, the embodiments and the modification examples include the following disclosure.

(Configuration 1)

An appearance inspection system (1) that performs appearance inspection by causing an imaging device (10) to image a target (W) when the imaging device (10) arrives at each of a plurality of imaging positions set for the target (W) while moving a relative position of the imaging device (10) with respect to the target (W), the appearance inspection system (10) including:

a setting part (67) that sets a route passing through the plurality of imaging positions in order;

a movement mechanism (30) that moves the relative position of the imaging device (10) with respect to the target (W) along the route; and a control part (14 and 16) that controls an imaging condition of the imaging device (10), wherein the setting part (67) sets the route so that a first time necessary for the movement mechanism (30) to move the imaging device (10) from a first imaging position to a second imaging position among the plurality of imaging positions is longer than a second time necessary for a process of changing a first imaging condition corresponding to the first imaging position to a second imaging condition corresponding to the second imaging position by the control part (14 and 16), and wherein the control part (14 and 16) starts the process of changing the first imaging condition to the second imaging condition earlier by the second time or more than a scheduled time at which the imaging device (10) arrives at the second imaging position when the movement mechanism (30) moves the imaging device (10) from the first imaging position to the second imaging position.

(Configuration 2)

The appearance inspection system (1) according to Configuration 1, further including:

an estimation part (66) that estimates the second time based on pre-decided information indicating a correlation between an imaging condition before a change and an imaging condition after the change, and a time necessary for a process of changing the imaging condition before the change to the imaging condition after the change.

(Configuration 3)

The appearance inspection system (1) according to Configuration 1 or 2, further including:

a notification part (24) that performs error notification when the control part (14 and 16) is not able to complete the process of changing the first imaging condition to the second imaging condition by the scheduled time.

(Configuration 4)

The appearance inspection system (1) according to any one of Configurations 1 to 3, wherein the control part (14 and 16) outputs a first state signal indicating that an instruction to change an imaging condition of the imaging device (10) is not receivable while the process of changing the first imaging condition to the second imaging condition is performed.

(Configuration 5)

The appearance inspection system (1) according to any one of Configurations 1 to 4, wherein the control part (14 and 16) outputs a second state signal indicating that an imaging instruction to the imaging device (10) is not receivable while the process of changing the first imaging condition to the second imaging condition is performed.

(Configuration 6)

An image processing device (20a) that is used in the appearance inspection system (1) according to Configuration 2 and determines quality of an appearance of the target (W) by processing an image captured by the imaging device (10), the image processing device (20a) including:

the estimation part (66).

(Configuration 7)

An image processing device (20 or 20a) that is used in the appearance inspection system (1) according to any one of Configurations 1 to 5 and determines quality of an appearance of the target (W) by processing an image captured by the imaging device (10), the image processing device (20 or 20a) including:

at least one of the setting part (67) and the control part (14 and 16).

(Configuration 8)

An imaging device (10) that is used in the appearance inspection system (1) according to Configuration 2, the imaging device (10) including:

the estimation part (66).

(Configuration 9)

An imaging device (10) that is used in the appearance inspection system (1) according to any one of Configurations 1 to 5, the imaging device (10) including:

at least one of the setting part (67) and the control part (14 and 16).

(Configuration 10)

An inspection method of performing appearance inspection by causing an imaging device (10) to image a target (W) when the imaging device (10) arrives at each of a plurality of imaging positions set for the target (W) while moving the imaging device (10), the inspection method including:

setting a route passing through the plurality of imaging positions in order;

moving a relative position of the imaging device (10) with respect to the target (W) along the route and controlling an imaging condition of the imaging device (10), wherein in the setting of the route, the route is set so that a first time necessary for moving the imaging device (10) from a first imaging position to a second imaging position among the plurality of imaging positions is longer than a second time necessary for a process of changing a first imaging condition corresponding to the first imaging position to a second imaging condition corresponding to the second imaging position, and wherein in the controlling of the imaging condition, the process of changing the first imaging condition to the second imaging condition starts earlier by the second time or more than a scheduled time at which the imaging device (10) arrives at the second imaging position.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An appearance inspection system that performs appearance inspection by imaging a target at a plurality of imaging positions set for the target, the appearance inspection system comprising:

an imaging device, comprising at least an image sensor and a communication interface, and configured to capture an image of the target when arriving at each of the plurality of imaging positions so as to generate an image data;

a processor, configured to set an imaging condition of the imaging device and to set a route passing through the plurality of imaging positions in order; and a movement mechanism, being controlled by the processor and configured to move a relative position of the imaging device with respect to the target along the route, wherein the imaging device is located on the movement mechanism, the imaging device generates the image data based on an amount of charge accumulated in the image sensor and transmits the image data to the processor via the communication interface coupled between the image sensor and the processor, and the processor performs an image processing on the image data acquired from the imaging device at each of the plurality of imaging positions to determine a quality of an appearance of the target, wherein the processor sets the route so that a first time necessary for the movement mechanism to move the imaging device from a first imaging position to a second imaging position among the plurality of imaging positions is longer than a second time necessary for a process of changing a first imaging condition corresponding to the first imaging position to a second imaging condition corresponding to the second imaging position by the processor, and wherein the processor starts the process of changing the first imaging condition to the second imaging condition via outputting a condition changing instruction to the communication interface of the imaging device earlier by the second time or more than a scheduled time at which the imaging device arrives at the second imaging position when the movement mechanism moves the imaging device from the first imaging position to the second imaging position, the processor is configured to change the image condition of the image device from the first image condition to the second image condition imaging device before the imaging device is moved to the second imaging position by the movement mechanism, and the imaging device is configured to instantly capture an image of the target under the second imaging condition upon arrival at the second imaging position.

2. The appearance inspection system according to claim 1, wherein the processor is further configured to estimate the second time based on pre-decided information indicating a correlation between an imaging condition before a change and an imaging condition after the change, and a time necessary for a process of changing the imaging condition before the change to the imaging condition after the change.

3. The appearance inspection system according to claim 2, wherein the processor is further configured to perform error notification when the control part is not able to complete the process of changing the first imaging condition to the second imaging condition by the scheduled time.

4. The appearance inspection system according to claim 3, wherein the processor outputs a first state signal indicating that an instruction to change an imaging condition of the imaging device is not receivable while the process of changing the first imaging condition to the second imaging condition is performed.

5. The appearance inspection system according to claim 3, wherein the processor outputs a first state signal indicating that an instruction to change an imaging condition of the imaging device is not receivable while the process of changing the first imaging condition to the second imaging condition is performed.

6. The appearance inspection system according to claim 2, wherein the processor outputs a first state signal indicating that an instruction to change an imaging condition of the imaging device is not receivable while the process of changing the first imaging condition to the second imaging condition is performed.

7. The appearance inspection system according to claim 6, wherein the processor outputs a second state signal indicating that an imaging instruction to the imaging device is not receivable while the process of changing the first imaging condition to the second imaging condition is performed.

8. The appearance inspection system according to claim 2, wherein the processor outputs a second state signal indicating that an imaging instruction to the imaging device is not receivable while the process of changing the first imaging condition to the second imaging condition is performed.

9. An image processing device that is used in the appearance inspection system according to claim 2 and determines quality of an appearance of the target by processing an image captured by the imaging device, the image processing device comprising:
the processor.

10. The appearance inspection system according to claim 1, wherein the processor is further configured to perform error notification when the control part is not able to complete the process of changing the first imaging condition to the second imaging condition by the scheduled time.

11. The appearance inspection system according to claim 10, wherein the processor outputs a first state signal indicating that an instruction to change an imaging condition of the imaging device is not receivable while the process of changing the first imaging condition to the second imaging condition is performed.

12. The appearance inspection system according to claim 11, wherein the processor outputs a second state signal indicating that an imaging instruction to the imaging device is not receivable while the process of changing the first imaging condition to the second imaging condition is performed.

13. The appearance inspection system according to claim 10, wherein the processor outputs a second state signal indicating that an imaging instruction to the imaging device is not receivable while the process of changing the first imaging condition to the second imaging condition is performed.

14. The appearance inspection system according to claim 1, wherein the processor outputs a first state signal indicating that an instruction to change an imaging condition of the imaging device is not receivable while the process of changing the first imaging condition to the second imaging condition is performed.

15. The appearance inspection system according to claim 14, wherein the processor outputs a second state signal indicating that an imaging instruction to the imaging device is not receivable while the process of changing the first imaging condition to the second imaging condition is performed.

16. The appearance inspection system according to claim 1, wherein the processor outputs a second state signal indicating that an imaging instruction to the imaging device is not receivable while the process of changing the first imaging condition to the second imaging condition is performed.

17. An image processing device that is used in the appearance inspection system according to claim 1 and determines quality of an appearance of the target by processing an image captured by the imaging device, the image processing device comprising:
the processor.

18. An inspection method of performing appearance inspection by imaging a target at a plurality of imaging positions set for the target using an imaging device while moving the imaging device using a movement mechanism,
wherein the imaging device is located on the movement mechanism and comprises at least an image sensor and a communication interface,
wherein the inspection method comprises:
setting a route passing through the plurality of imaging positions in order;
controlling the imaging device to capture an image of the target when arriving at each of the plurality of imaging positions so as to generate an image data while controlling the movement mechanism to move a relative position of the imaging device with respect to the target along the route, wherein the image data is generated based on an amount of charge accumulated in the image sensor;
controlling an imaging condition of the imaging device;
acquiring the image data generated by the imaging device via the communication interface of the imaging device; and
performing an image processing on the image data generated by the imaging device at each of the plurality of imaging positions to determine a quality of an appearance of the target,
wherein, in the setting of the route, the route is set so that a first time necessary for moving the imaging device from a first imaging position to a second imaging position among the plurality of imaging positions is longer than a second time necessary for a process of changing a first imaging condition corresponding to the first imaging position to a second imaging condition corresponding to the second imaging position, and
wherein, in the controlling of the imaging condition, the process of changing the first imaging condition to the second imaging condition via outputting a condition changing instruction to the communication interface of the imaging device starts earlier by the second time or more than a scheduled time at which the imaging device arrives at the second imaging position, so as to change the imaging condition of the imaging device from the first imaging condition to the second imaging condition before the imaging device is moved to the second imaging position by the movement mechanism and to enable imaging device to instantly capture an image of the target under the second imaging condition upon arrival at the second imaging position.

* * * * *